United States Patent [19]

Timmerman et al.

[11] Patent Number: 4,762,991
[45] Date of Patent: Aug. 9, 1988

[54] PROBE FOR OPTICALLY MONITORING PROGRESS OF IN-SITU VITRIFICATION OF SOIL

[75] Inventors: Craig L. Timmerman; Kenton H. Oma; Karl C. Davis, all of Richland, Wash.

[73] Assignee: Battelle Memorial Institute, Richland, Wash.

[21] Appl. No.: 56,582

[22] Filed: May 29, 1987

[51] Int. Cl.⁴ ............................................. H01J 5/16
[52] U.S. Cl. ................................. 250/227; 405/128; 252/629
[58] Field of Search ............... 250/227, 231 R, 506.1; 374/161, 162; 405/128, 129; 252/629

[56] References Cited

U.S. PATENT DOCUMENTS 4,615,833 8/1986 Kaufmann ......................... 252/629
4,634,187 1/1987 Huff et al. ......................... 405/128

*Primary Examiner*—Edward P. Westin
*Assistant Examiner*—Khaled Shami
*Attorney, Agent, or Firm*—Dellett, Smith-Hill and Bedell

[57] ABSTRACT

A detector system for sensing the progress of an ISV process along an expected path comprises multiple sensors each having an input port. The input ports are distributed along the expected path of the ISV process between a starting location and an expected ending location. Each sensor generates an electrical signal representative of the temperature in the vicinity of its input port. A signal processor is coupled to the sensors to receive an electrical signal generated by a sensor, and generate a signal which is encoded with information which identifies the sensor and whether the ISV process has reached the sensor's input port. A transmitter propagates the encoded signal. The signal processor and the transmitter are below ground at a location beyond the expected ending location of the ISV process in the direction from the starting location to the expected ending location. A signal receiver and a decoder are located above ground for receiving the encoded signal propagated by the transmitter, decoding the encoded signal and providing a human-perceptible indication of the progress of the ISV process.

25 Claims, 3 Drawing Sheets

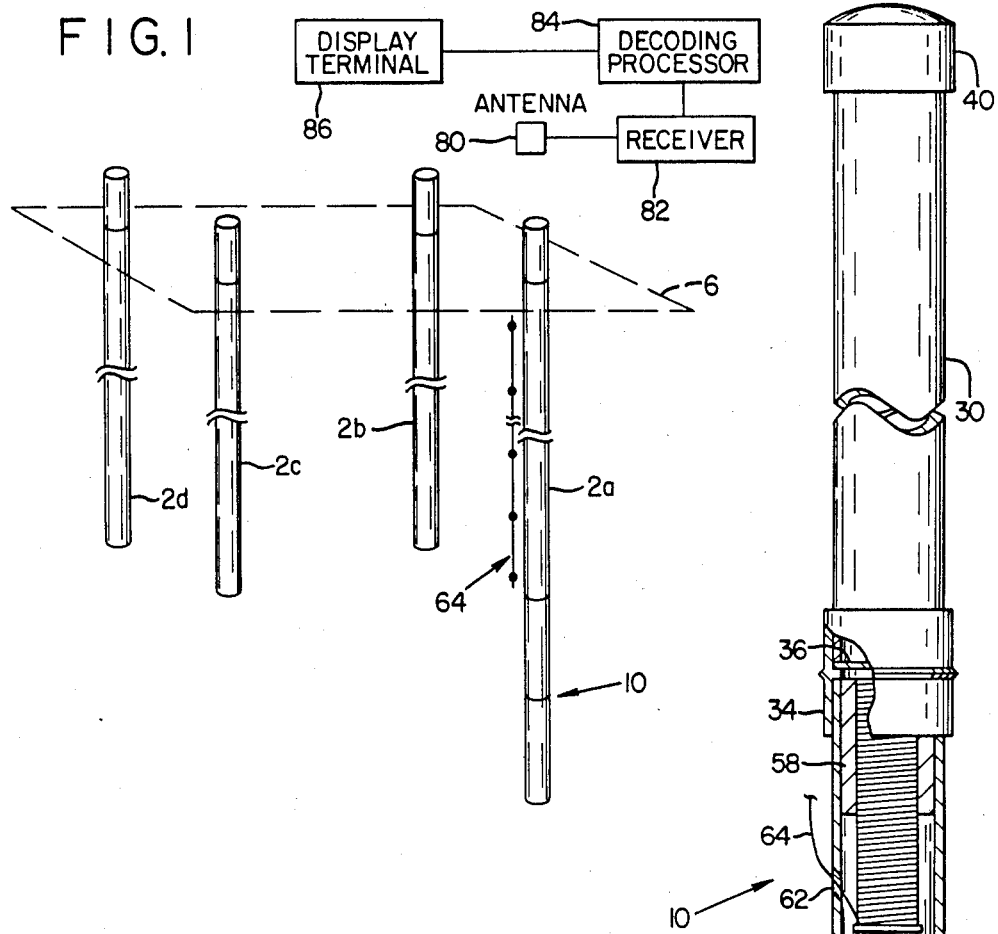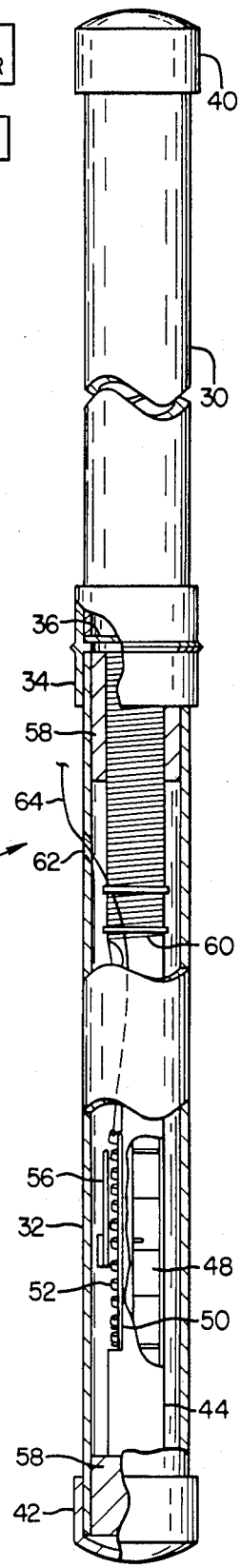

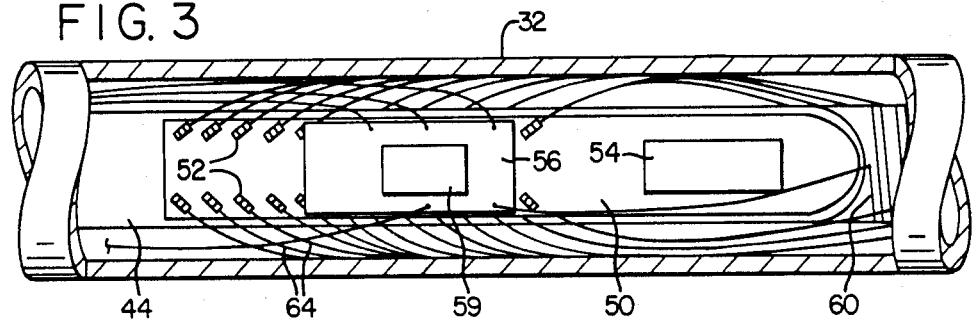
FIG. 3
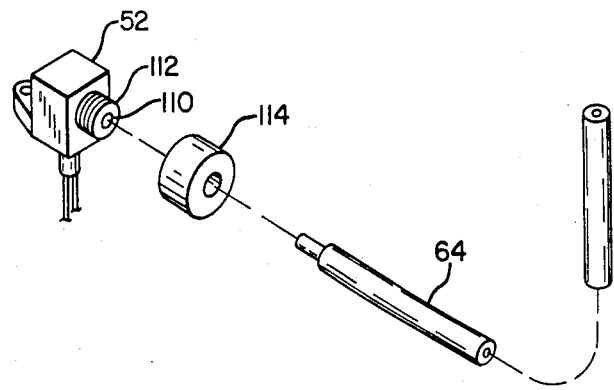
FIG. 4
FIG. 5
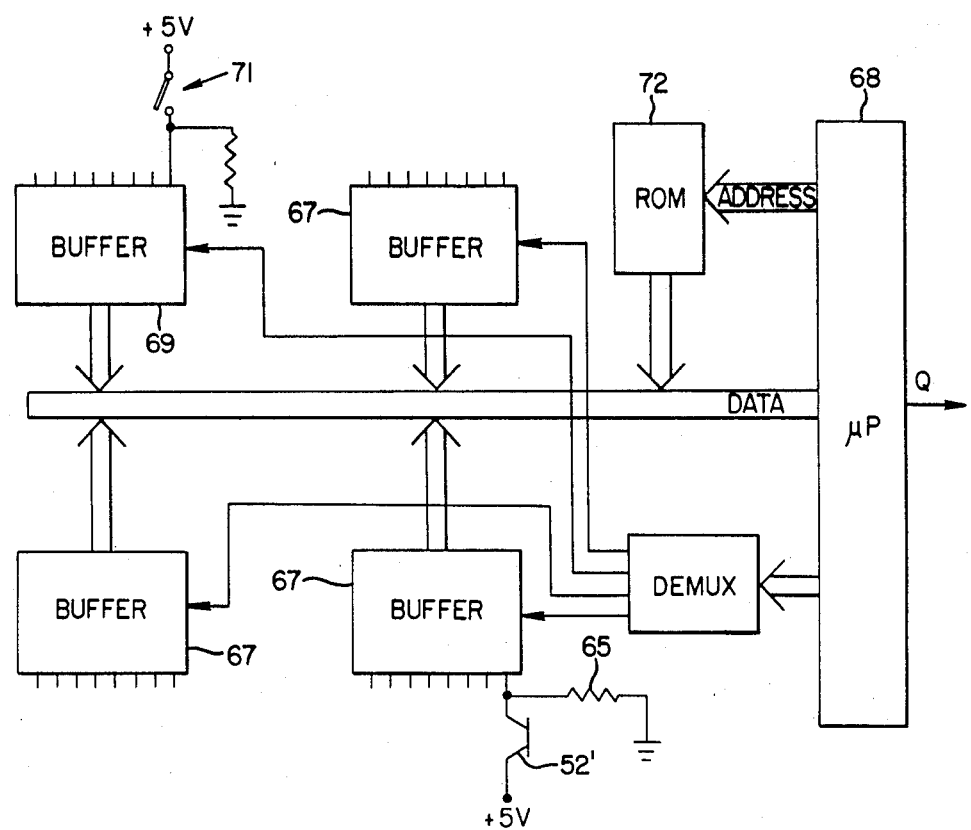

PROBE FOR OPTICALLY MONITORING PROGRESS OF IN-SITU VITRIFICATION OF SOIL

This invention was made with government support under contract number DE-AC06-76R LO 1830, awarded by the U.S. Department of Energy. The government has certain rights in the invention.

BACKGROUND OF THE INVENTION

This invention relates to in-situ vitrification (ISV), and particularly to means for sensing the progress of an ISV process.

In-situ vitrification (ISV) has been proposed as a process for in-place stabilization of a contaminated soil formation. The ISV process is carried out by placing four electrodes in the soil formation at the corners of a square. Tests indicate that electrode separations of at least 5.5 m may be used, allowing treatment of a site having a surface area of over 30 m$^2$. A conductive mixture of flaked graphite and glass frit is placed in an X pattern between the electrodes, in shallow trenches on the soil surface. Voltages are applied to the electrodes, and the graphite mixture conducts current between the electrodes. The graphite mixture is quickly heated to soil-melting temperatures (1,100 degrees to 1,600 degrees C.). As the surrounding soil melts, it becomes electrically-conductive and the affected soil volume grows downward and outward until the desired soil volume has been completely vitrified and the waste material is thereby encapsulated in the vitreous mass.

It is desirable that the depth to which the ISV process has progressed be monitored, in order to determine that the process is proceeding as expected. It is also desirable to be able to ensure that the soil has been vitrified to the desired depth before the ISV operation is stopped. The soil temperature may reach 2,000° C., and therefore methods for determining depth are restricted to those that do not intrude into the molten zone. At such high temperatures, the soil emits radiant light.

SUMMARY OF THE INVENTION

A preferred embodiment of the present invention, in a first aspect, is ISV apparatus comprising at least two electrodes extending within a soil formation and a detector system for sensing the progress along an expected path of an ISV process performed using the electrodes. The detector system comprises a plurality of sensors each having an input port. The input ports are distributed along the expected path of the ISV process between a starting location and an expected ending location. Each sensor generates an electrical signal representative of the temperature in the vicinity of its input port. Signal processor and transmitter means are coupled to the sensors to receive an electrical signal generated by a sensor, generate a signal which is encoded with information which identifies the sensor and whether the ISV process has reached the sensor's input port, and propagate the encoded signal. The signal processor and transmitter means are below ground at a location beyond the expected ending location of the ISV process in the direction from the starting location to the expected ending location. Signal receiver and decoder means are located outside the soil formation for receiving the encoded signal propagated by the signal processor and transmitter means, decoding the encoded signal and providing a human-perceptible indication of the progress of the ISV process.

A preferred embodiment of the present invention in its second aspect is a method of carrying out an ISV process using at least two electrodes extending within a soil formation. The method comprises positioning a plurality of sensors, each having an input port, in the soil formation so that the input ports are distributed along an expected path of the ISV process between a starting location and an expected ending location. Each sensor generates an electrical signal representative of the temperature in the vicinity of its input port. The method also comprises locating signal processor and transmitter means below ground at a location beyond the expected ending location of the ISV process in the direction from the starting location to the expected ending location. The signal processor and transmitter means are coupled to receive the electrical signals generated by the sensors. The signal processor and transmitter means respond to a signal generated by one of the sensors by generating a signal which is encoded with information which identifies the sensor and whether the ISV process has reached the sensor's input port, and propagating the encoded signal to signal receiver and decoder means which are located outside the soil formation. The signal receiver and decoder means decode the encoded signal and provide a human-perceptible indication of the progress of the ISV process.

It is accordingly an object of the invention to provide improved detector means for sensing the progress of an ISV process.

BRIEF DESCRIPTION OF THE DRAWINGS

For a better understanding of the invention, and to show how the same may be carried into effect, reference will now be made, by way of example, to the accompanying drawings in which:

FIG. 1 is schematic perspective view of apparatus for carrying out an ISV process, which apparatus includes a transmitter assembly for providing signals representing the depth to which the ISV process has progressed, FIG. 2 is a partially cutaway side view of the transmitter assembly, FIG. 3 is a partial sectional view of the transmitter assembly, FIG. 4 is an enlarged, partly exploded view of a sensor which forms part of the transmitter assembly, FIG. 5 is a partially schematic block diagram of a signal processor circuit to which the sensor is connected.

DETAILED DESCRIPTION

Figure 6:
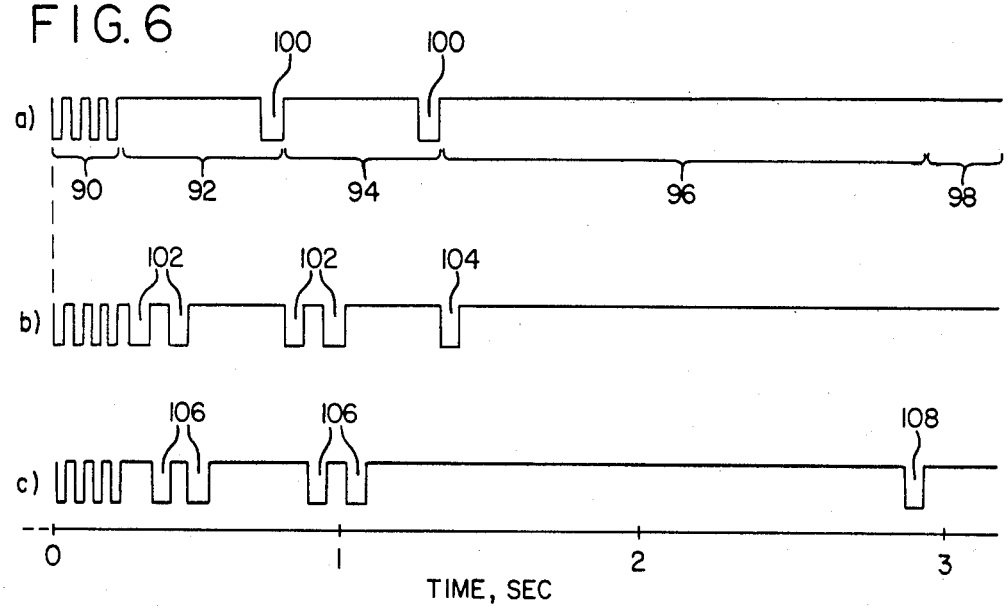
FIG. 6 illustrates a series of waveforms to aid in describing the signal provided by the signal processor circuit.

The ISV apparatus illustrated in FIG. 1 comprises four electrodes 2a, 2b, 2c and 2d which extend vertically into respective boreholes within a contaminated soil formation and project at their upper ends above the ground surface 6. The electrodes are connected to a high voltage current supply (not shown) for carrying out an ISV process on the soil formation.

An elongate transmitter assembly 10 is located beneath the lower end of the electrode 2a. The transmitter assembly, which is shown in greater detail in FIGS. 2 and 3, comprises two tubes 30 and 32 which are axially aligned and are mechanically coupled by a sleeve 34. A solid disc 36 separates the interior space of the tube 30 from the interior space of the tube 32, and the tubes 30 and 32 are provided with end caps 40 and 42 respectively. The cap 40 is formed with a hole (not shown), whereas the cap 42 is solid. The tubes 30, 32, the sleeve 34, the disc 30 and the end caps 40, 42 are made of dielectric material, such as PCV. The cap 40 is not initially attached to the tube 30. When the transmitter assembly is about to be installed, the electrode 2a is suspended vertically above the ground and the cap 40 is attached to its lower end, e.g. by using a bolt passing through the hole in the cap 40. The tube 30, which is attached to the tube 32, is filled with sand, and is then cemented to the cap 40. The electrode 2a, with the transmitter assembly attached thereto, is lowered into its borehole. The transmitter assembly is thus vertically oriented with the tube 30 disposed between the tube 32 and the electrode 2a. The sand in the tube 30 serves as thermal and electrical insulating material to separate the interior space of the tube 32 from the electrode 2a.

The tube 32 contains an electronics mounting tube 44 which is made of dielectric material. The electronics mounting tube 44 has a sector cut from its wall, and a processor circuit board 50 is fitted in the resulting hole 46. A battery pack 48, comprising several batteries, is accommodated in the tube 44 behind the circuit board 50.

The processor circuit board 50 carries an array of twenty-four photodetectors 52 and a processor circuit 54. The photodetectors are Motorola type MFOD 72 fiber optic detectors, each including a phototransistor 52' (FIG. 5). A transmitter circuit board 56 is mounted over the board 50 by means of stand-offs (not shown) and carries a transmitter circuit 59 which receives the output of the processor circuit 54. The processor circuit and the transmitter circuit are illustrated in FIG. 3 simply as blocks.

Figure 7:
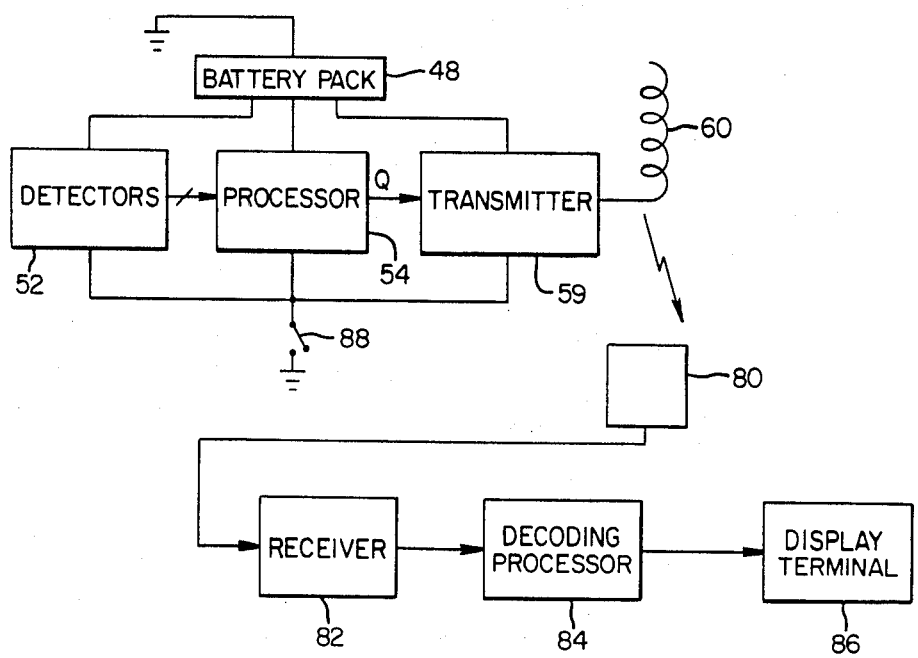
FIG. 7 is a block diagram showing the path that is followed by signals generated by the transmitter assembly.

The transmitter assembly 10 is designed to be stored in a horizontal orientation and includes a mercury switch 88 (FIG. 7) which is open and isolates the battery pack 48 from the circuits 54 and 59 when the assembly is in its storage orientation. When the assembly is vertical, the mercury switch is closed and the battery pack is connected to the phototransistors 52' and the circuits 54 and 59. The transmitter circuit 59 is coupled to an antenna wire 60. The wire 60 is wrapped about the tube 44, and the tube 44 is supported coaxially inside the tube 32 by spacers 58 of dielectric material.

Twenty-four optical fibers 64 are mechanically and optically coupled to the photodetectors 52 respectively. Preferably, the package of each photodetector has an orifice 110 (FIG. 4), defined by an externally threaded stub 112, for receiving an end of an optical fiber. Each optical fiber comprises a core and a cladding, which are both of transparent material, and a protective jacket. At one end of the fiber, the jacket is removed over a distance of about 1.6 mm and the end of the fiber is inserted through a locking nut 114. The end of the fiber is inserted into the orifice 112 of the photodetector package and the locking nut is screwed onto the threaded stub 112. The twenty-four fibers 64 leave the tube 32 by way of an opening 62 (FIG. 2), which is sealed by a body of RTV (room temperature vulcanizable) silicone sealant material. When the transmitter assembly is installed beneath the electrode 2a, the fibers 64 each extend vertically upwards from the transmitter assembly 10. The fibers are of different respective lengths, so that the upper ends of the fibers are spaced apart along the electrode 2a. At its upper end, each fiber is cut perpendicular to its length so as to provide an input port which collects optical radiation. Optical radiation that is collected by the input port of a fiber is conducted by the core of the fiber and is applied to the associated photodetector.

The collector-emitter path of the phototransistor 52' of each photodetector 52 is connected in series with a resistor 65 (FIG. 5) between two terminals of the battery pack 48. The voltage at the connection point depends on the magnitude of the current conducted by the phototransistor and this in turn depends on the intensity with which the phototransistor is illuminated. The intensity of illumination of the phototransistor depends on the temperature in the soil at the level of the input port. The combination of the optical fiber and its associated phototransistor thus serves as a sensor for detecting the temperature of the soil at the level of the input port.

The connection point of each phototransistor 52' and its associated resistor 65 is connected to the signal processor circuit 54 by way of an inverting buffer. The buffer provides a binary output signal of which the level (logical 1 or logical 0) depends on whether the voltage at its input is below or above a threshold value. The relationship between the level of the binary output signal and the optical power incident on the phototransistor is determined by the value of the resistor 65. The twenty-four buffers that are required are implemented as three type 74 HCT 240 octal buffers 67. A fourth type 74 HCT 240 octal buffer 69 has its input terminals connected to an eight-position switch unit 71. The switch unit 71 is used to encode an identification number. T for the transmitter assembly. In an implementation of the invention, the identification number is encoded using only four switches of the switch unit. A fifth switch is used to invoke a test routine, and the remaining switches are inactive. The output terminals of each octal buffer 67 and 69 are connected to respective lines of the data bus of a microprocessor 68, which operates under control of a program stored in a read-only memory 72. The microprocessor 68 is a type CDP 1805 AC microprocessor, and a listing of the program used to control operation of the microprocessor 68 is contained in Appendix A.

The processor circuit is off when the mercury switch 88 is open. When the switch 88 is closed, the processor circuit has three distinct modes of generation. The power-up mode is entered immediately the switch 88 is closed. In the powerup mode, the microprocessor executes a scan routine. In the scan routine, the microprocessor 68 determines the state of each switch of the switch unit 71 and the state of each phototransistor 52'. This is accomplished by enabling the four buffers successively, using a demultiplexer 70 which operates under control of the microprocessor 68, and polling the eight lines of the data bus sequentially while each buffer is enabled. The microprocessor 68 generates a binary signal Q which is encoded with the information regarding the states of the switches and the states of the phototransistors. The waveform of the typical signal Q has five distinct slots 90, 92, 94, 96 and 98 as shown in FIG. 6. The slot 90 contains a synchronization burst. Each of the slots 92 and 94 contains four bits of data representing the identification number T. The slot 96 contains twenty-four bits representing the states of the phototransistors respectively, and the slot 98 contains a pause. The aggregate duration of the five slots is 3.2 seconds. FIG. 6(a) illustrates the waveform of the signal Q for the case in which the transmitter assembly is in the test mode, no identification number has been encoded and none of the inputs to the buffers 67 exceeds the threshold level, and accordingly shows only the burst and pulses 100 which signify that the switch invoking the test mode is closed. In FIG. 6(b), the pulses 102 in the slots 92 and 94 represent binary 0101, or decimal 5, and the pulse 104 in the slot 96 indicates that the buffer input for the phototransistor coupled to the most distant input port exceeds the threshold level. In FIG. 6(c), the pulses 106 in the slots 92 and 94 represent binary 1010, or decimal 10, and the pulse 108 in the slot 96 indicates that the buffer input for the phototransistor coupled to the nearest input port exceeds the threshold level.

The encoded signal Q is applied to the transmitter circuit 59, and the transmitter circuit uses the encoded signal to modulate a carrier. The modulated carrier is applied to the antenna wire 60 and an electromagnetic signal is radiated thereby. The processor circuit then enters an idle mode unless the buffer input for a phototransistor that is coupled to one of the eight input ports that are farthest from the transmitter assembly exceeds the threshold level, in which case it enters the active mode.

When the processor circuit is in the idle mode, the microprocessor 68 executes the scan routine at intervals of [3.2 sec (2314+3T)]. When a phototransistor that is coupled to one of the eight most distant input ports is conductive, the processor circuit enters the active mode and executes the scan routine at intervals of [3.2 sec (64+3T)]. Once the processor circuit is in the active mode, it remains in the active mode for approximately nine hours after all the phototransistors have become non-conductive. At this time, the processor circuit returns to the idle mode to preserve battery life.

Above the ground surface and outside the area that is expected to be influenced by the ISV process is a receiving antenna 80. The antenna 80 receives the signal that was radiated by the antenna wire 60 and applies the signal to a receiver 82. The receiver 82 demodulates the signal and reconstructs the signal that was applied to the transmitter circuit by the processor circuit 54. A decoding processor 84 decodes the signal provided by the receiver 82, performs error checks on the decoded signal, converts the decoded signal to digital form and transmits the digital signal to a display terminal 86 which displays and prints out the depth status of the melt and an indication of the signal strength of the transmission received. An example of the output data stream that may be displayed is as follows:

D,5,6,G,X,X,X,X,X,X,X,X,X,X,X,X,X,X,X,X,X,X,X,X,X,X,X,X a b c d          e where
"a" indicates that data will follow.
"b" is the identification number of the transmitter assembly.
"c" is the absolute signal strength of the transmission based on a scale from 0 to 9.
"d" designates whether both identification number transmissions were understood by the decoding processor. "G" will appear if both transmissions were received and were consistent. "B" will appear if the transmissions were not consistent or if one or both of the transmissions were not clearly received.
"e" represents the sensor status for the twenty-four sensors.

Each number X representing the status of a sensor is in the range from 0 to 9, depending on the relationship between the voltage level of the signal provided by the receiver 82 during the portion of the time slot 96 that relates to the particular sensor and the absolute signal strength, represented by the portion "c" of the display.

The decoding processor employs a Z80 microprocessor, and a listing of the program used to control operation of the Z80 microprocessor is contained in Appendix B.

It is preferred that each optical fiber have a silica core and a cladding of silica doped with a small amount of fluorine so that it has a smaller refractive index than the core. A suitable fiber is that which is manufactured by Raychem and is sold under the designation VSC-1B-10-17. It has been found that this type of fiber provides a much greater increase in signal strength with increase in soil temperature than other fibers that were tested, such as fibers having a silica core and a polymeric cladding. At moderate temperatures (450° to 550° C.) the polymeric claddings fibers were destroyed and the light conductivity of these fibers dropped essentially to zero. A dramatic increase in the phototransistor current provided by the fiber with the silica plus fluorine cladding took place at about 800° C. Even at temperatures above 900° C., the fiber with the silica plus fluorine cladding provided a phototransistor current output from about 14 to about 100 times the maximum current output provided by phototransistors coupled to the fibers with a polymeric cladding. The fiber with the silica plus fluorine cladding was able to survive exposure to temperatures in excess of 1100° C. The use of a silica-based cladding is considered to be the key to the superior performance at high temperatures of the fiber with the silica plus fluorine cladding. At least part of the phototransistor current provided by the silica plus fluorine fiber may be caused by radiation generated within the fiber itself due to heating of the fiber.

It will be appreciated that the present invention is not restricted to the particular embodiment that has been described, and that variations may be made therein without departing from the scope of the invention as defined in the appended claims and equivalents thereof. For example, the electrode 2a acts as a passive repeater and aids in propagating the signal radiated by the antenna wire, but it is not essential to the invention that the transmitter assembly be placed directly beneath one of the electrodes. If the transmitter assembly is not placed beneath an electrode, a metal rod may be placed above the transmitter assembly to assist in data transmission. Multiple transmitter assemblies, encoded with different identification numbers, may be used simultaneously to monitor the progress of the ISV process at different locations, and since the identification numbers are different the decoding processor is able to distinguish among the signals provided by the different transmitter assemblies. In this manner information relating to the progress of the process at the different locations can be displayed and printed out.

```
Tektronix      1802 ASM V4.0  DELAY FOR TELEMETRY

00002                     NAME    TEL4
00003                     GLOBAL  BEGIN,TRANS
00004           ;                             TEL is a telemetry program for the 1805
00005           ; microprocessor which controls a transmitter by appropriate setting and
00006           ; resetting of the 1805 Q bit. The information transmitted consists of
00007           ; 32 bits of data, the first eight of which are set by a DIP switch and
00008           ; serve as information for the program. The other 24 bits of data are
00009           ; obtained from up to 24 photo-transistors which sense infrared light
00010           ; coupled through a fiber optic. These sensors will detect the depth of
00011           ; melting in the waste vitrification project.
00012           ;
00013           ; Tel has three modes, depending upon the status of the input data. The
00014           ; three modes are TEST, IDLE, and ACTIVE.  The rocker DIP
00015           ; switch #8 is a test switch which will cause TEL to transmit constantly
00016           ; as long as the switch is on
00017           ; Furthermore, a low sensor bit means
00018           ; the sensor is active (senses infrared light)
00019           ; When TEL starts it is in the IDLE mode. In the IDLE mode the transmitter
00020           ; transmits data approximately once every two hours. TEL remains in the IDLE
00021           ; mode until a sensor becomes active. It then transmits each 3 to 5 1/2 minutes
00022           ; depending upon its transmitter number encoded in the first four input
00023           ; switches
00024           ; Once a sensor becomes active, TEL changes to the ACTIVE mode and remains in
00025           ; the ACTIVE mode for approximately 9 hours after all the sensors become
00026           ; inactive again. Once the sensors have been inactive for 9.1 hours, TEL
00027           ; reverts to the IDLE mode
00028           ;
00029           ;               REGISTER ASSIGNMENTS.
00030           ;
00031           ;  R0      PC upon startup, PC while interrupt PC is being reset.
00032           ;  R1      PC for interrupt code (most of the program)
00033           ;  R2      Index register, points at memory for data input, ADD command
00034           ;  R3      Unused
00035           ;  R4      Half Bit Counter
00036           ;  R5.0    Next Q register
00037           ;  R5.1    Data to serialize
00038           ;  R6      Pointer to memory for data input
00039           ;  R7      Idle Counter  counts frames after all sensors inactive
00040           ;  R8      Frame Counter  counts frames between transmissions
00041           ;
00042           ;  RA      Pointer to RAM for arithmetic
00043           ;
00044           ;  RB - RF  unused
00045           ;
00046           ;               RAM MEMORY MAP
00047           ;
00048           ;  810 to 813   Storage for data input from switches and sensors
00049           ;  830          Ram for arithmetic
00050           ;
00051           ; DELAY WAITS THE APPROPRIATE TIMES BETWEEN TRANSMISSIONS
00052 0000 71            BEGIN  DIS
00053 0001 00                   BYTE   0       ; PUT A ZERO BYTE HERE FOR STARTUP
00054 0002 70                   CHI    R0      ; MAKE D = 0
00055 0003 B4                   PHI    R4      ; Initialize Half Bit Counter
00056 0004 A4                   PLO    R4
00057 0005 A9                   PLO    R9      ; Initialize divide by four register
00058 0006 B7                   PHI    R7      ; INITIALIZE IDLE COUNTER
00059 0007 B8                   PHI    R8      ; Clear hi byte of frame counter
00060 0008 A7                   PLO    R7
00061 0009 B1                   PHI    R1      ; Initialize hi byte of interrupt program counter
00062 000A A5                   PLO    R5      ; Set next Q bit to transmitter on
00063 000B FC01                 ADI    1       ; SET FRAME COUNTER FOR IMMEDIATE TRANSMISSION
00064 000D A8                   PLO    R8
00065 000E F812         ; WAIT  LDI    LO(SKIP)
00066 0010 A0                   PLO    R0
00067 0011 D0                   SEP    0
00068 0012 C4           SKIP    NOP
00069 0013 D0                   SEP    0
00070 0014 E0                   SEX    0
00071 0015 F81D         ;       LDI    LO(COUNT)
00072 0017 A1                   PLO    R1
00073 0018 680A                 BYTE   68H,0AH        ; External Interrupt Enable
00074 001A 70                   RET
00075 001B 00                   BYTE   0   ; Set X=0,P=0
00076 001C 00                   IDL
```

```
00077 001D 84            COUNT   GLO     R4              . See if frame time has elapsed
00078 001C FF60                  SMI     96              . 96 interrupts = 1 frame
00079 0020 3325     )            BPZ     TRAN            . Check for time to transmit
00080 0022 14                    INC     R4              . Increment Half Bit counter
00081 0023 300E     ,            BR      WAIT            . Wait for interrupt
00082 0025 68           TRAN     BYTE    68H             . RLDI 4,0000
00083 0026 C4                    BYTE    0C4H
00084 0027 00                    BYTE    0
00085 0028 00                    BYTE    0
00086 0029 87                    GLO     R7              . Look at Idle Counter
00087 002A 3A2F     ,            BNZ     DECR            . Decrement Idle Counter if not = 0
00088 002C 97                    GHI     R7
00089 002D 3230     )            BZ      A
00090 002F 27           DECR     DEC     R7
00091 0030 68           A        BYTE    68H             . RLDI 6,0810 Point R6 at data location
00092 0031 C6                    BYTE    0C6H
00093 0032 08                    BYTE    08H
00094 0033 10                    BYTE    10H
00095 0034 68                    BYTE    68H             . RNX 6
00096 0035 84                    BYTE    084H
00097 0036 69                    INP     1               . Put data in 810,811,812,813
00098 0037 12                    INC     2
00099 0038 6A                    INP     2
00100 0039 12                    INC     2
00101 003A 6B                    INP     3
00102 003B 12                    INC     2
00103 003C 6C                    INP     4
00104 003D 46                    LDA     6               . Get switch data
00105 003E FA80                  ANI     80H             . Look at test switch
00106 0040 3A48     )            BNZ     NOTEST          . If switch is on, no test (inverted logic)
00107 0042 F800                  LDI     0
00108 0044 38                    PHI     R8
00109 0045 A8                    PLO     8               . Put a 0 in frame counter. Transmit each time
00110 0046 306A     )            BR      C               . Skip sensor check to avoid changing IDLE status
00111 0048 28           NOTEST   DEC     R8
00112 0049 46                    LDA     R6              . Look at sensors 1-8
00113 004A FBFF                  XRI     0FFH            . See if any are active (active means a zero,
00114 004C 3A5A     )            BNZ     B               .   which means a non-zero XOR)
00115 004E 46                    LDA     R6              . Look at sensors 9-16
00116 004F FBFF                  XRI     0FFH
00117 0051 3A5A     )            BNZ     B
00118 0053 46                    LDA     R6              . Look at sensors 17-24
00119 0054 F9F0                  ORI     0F0H            . Mask bits 21-24 make them high
00120 0056 FBFF                  XRI     0FFH
00121 0058 326A     )            BZ      C               . No sensors active, skip
00122 005A 97           B        GHI     R7
00123 005B 3A64     )            BNZ     C               . If not in Idle mode, reset Idle Counter
00124 005D 87                    GLO     R7
00125 005E 3A64     )            BNZ     C
00126 0060 F800                  LDI     0               : Put a zero in frame counter if in idle mode
00127 0062 A8                    PLO     R8
00128 0063 38                    PHI     R8
00129 0064 F88D         C        LDI     8DH             . Reset Idle Counter to 278D hexadecimal
00130 0066 A7                    PLO     R7              . Reset Idle Counter
00131 0067 F827                  LDI     27H
00132 0069 37                    PHI     R7
00133 006A 88           C        GLO     R8              . Look at frame counter   time to send?
00134 006B 3A0E     )            BNZ     WAIT            . FC not = 0, wait for next frame time
00135 006D 98                    GHI     R8
00136 006E 3A0E     )            BNZ     WAIT
00137 0070 68                    BYTE    68H             . RLDI 6,0810 Point at data
00138 0071 C6                    BYTE    0C6H
00139 0072 08                    BYTE    08H
00140 0073 10                    BYTE    10H
00141 0074 06                    LDN     6               . Get switch data
00142 0075 FA80                  ANI     80H             . Look at test switch
00143 0077 3A81     )            BNZ     COMP            . Switch on, compute next frame time
00144 0079 F801                  LDI     1               . Put a 1 in frame counter
00145 007B A8                    PLO     R8
00146 007C F800                  LDI     0
00147 007E 38                    PHI     R8
00148 007F 309F     )            BR      TRANS
00149 0081 06           COMP     LDN     R6              . Get the switch data
00150 0082 FA0F                  ANI     0FH             . Mask high bits
00151 0084 FB0F                  XRI     0FH             . Invert data
00152 0086 68                    BYTE    68H             . RLDI A,0830 Point reg A at RAM
00153 0087 CA                    BYTE    0CAH
```

```
00154 0088 08                    BYTE     08H
00155 0089 30                    BYTE     30H
00156 008A 68                    BYTE     68H     , RNX A  , point reg X at RAM also
00157 008B 0A                    BYTE     0CAH
00158 008C 5A                    STR      RA      , Store in RAM
00159 008D FE                    SHL              , Get 2T
00160 008E F4                    ADD              , Add 2T to T to get 3T
00161 008F FC40                  ADI      64      , Add 64 to get 64 + 3T
00162 0091 A8                    PLO      R8      , Put into frame counter
00163 0092 87                    GLO      R7      , Look at Idle Counter
00164 0093 3A9F       )          BNZ      TRANS   , Idle counter not = 0, transmit
00165 0095 97                    GHI      R7
00166 0096 3A9F       )          BNZ      TRANS
00167 0098 88                    GLO      R8      , Get frame counter
00168 0099 FCCA                  ADI      0CAH    , Add 8CA hexadecimal for idle mode
00169 009B A8                    PLO      R8
00170 009C F809                  LDI      9       , This add always generates a carry, so put
00171 009E B8                    PHI      R8      , 9 rather than 8 into the high byte
00172 009F 680B     .TRANS BYTE     68H,00BH         , X0
00173 00A1 F8A5     )  TWAIT LDI      LO(SK)
00174 00A3 A0                    PLO      R0
00175 00A4 D0                    SEP      0
00176 00A5 C4          SK  NOP
00177 00A6 D0                    SEP      0
00178 00A7 E0                    SEX      0
00179 00A8 F800                  LDI      0
00180 00AA B1                    PHI      R1      , Hi byte of interrupt PC
00181 00AB F8B3     )            LDI      LO(GO)
00182 00AD A1                    PLO      R1      , Set interrupt PC at transmit interrupt routine
00183 00AE 680A                  BYTE     68H,00AH       , X0
00184 00B0 70                    RET
00185 00B1 00                    BYTE     0       , Set X = 0, P = 0
00186 00B2 00                    IDL
00187 00B3 14          GO  INC      R4      , Increment Half Bit Counter
00188 00B4 85                    GLO      R5
00189 00B5 32BA     )            BZ       RESET
00190 00B7 7B                    SEQ
00191 00B8 30BB     )            BR       NEXT
00192 00BA 7A         RESET REQ
00193 00BB 84         NEXT  GLO      R4
00194 00BC FF08                  SMI      8
00195 00BE 33D2     )            BM       HEAD
00196 00C0 FF50                  SMI      80      , Subtract 80 for data field check
00197 00C2 3BD8     )            BM       DATA
00198 00C4 FF08                  SMI      8
00199 00C6 33F8     )            BM       PAUSE
00200 00C8 F800                  LDI      0       , Initialize for transmitter on
00201 00CA A5                    PLO      R5
00202 00CB B4                    PHI      R4
00203 00CC F860                  LDI      96      , Put 96 in HBC
00204 00CE A4                    PLO      R4
00205 00CF 7B                    SEQ              , Turn transmitter off
00206 00D0 300E     )            BR       WAIT
00207 00D2 84         HEAD  GLO      R4
00208 00D3 FA01                  ANI      1
00209 00D5 A5                    PLO      R5
00210 00D6 30A1     )            BR       TWAIT   , Wait for next interrupt
00211 00D8 84         DATA  GLO      R4      , Get Half Bit Counter
00212 00D9 FF08                  SMI      8       , Check for first switch data transmission
00213 00DB 3AE1     )            BNZ      NOT
00214 00DD 06                    LDN      6       , Load without advance the switch data
00215 00DE B5                    PHI      R5      , Store switch data for transmission
00216 00DF 30EA     )            BR       F       , Send data
00217 00E1 84         NOT   GLO      R4      , Get half bit counter again
00218 00E2 FF08                  SMI      8       , IF(HBC-8) MOD 16 = 0, get next byte
00219 00E4 FA0F                  ANI      00FH
00220 00E6 3AEA     )            BNZ      F
00221 00E8 46                    LDA      6
00222 00E9 B5                    PHI      R5
00223 00EA 84          F   GLO      R4      , If HBC is odd, Q is unchanged
00224 00EB FA01                  ANI      1
00225 00ED 3AA1     )            BNZ      TWAIT
00226 00EF 95                    GHI      R5      , Get byte
00227 00F0 F6                    SHR              , Shift low bit into carry  Compensates for PC board
00228 00F1 B5                    PHI      R5      , Save shifted bit
00229 00F2 F800                  LDI      0
00230 00F4 7E                    SHLC             , Shift carry into low bit
```

```
00231 00F5 A5            PLO    R5       . Put into R5 0
00232 00F6 30A1    )     BR     TWAIT    . Wait for next interrupt
00233 00F8 F801   PAUSE  LDI    1
00234 00FA A5            PLO    R5       . Turn transmitter off for pause
00235 00FB 30A1    )     BR     TWAIT
00236      0000    )     END    BEGIN
``` ktronix        1802 ASM V4 0   Symbol Table alars

```
R0 ----- 0000        R1 ----- 0001        R2 ----- 0002        R3 ----- 0003
R5 ----- 0005        R6 ----- 0006        R7 ----- 0007        R8 ----- 0008
RA ----- 000A        RB ----- 000B        RC ----- 000C        RD ----- 000D
RF ----- 000F
```

INALO (default) Section (00FD)

```
A ------ 0030        B ------ 005A        BEGIN -- 0000 G      C ------ 006A
COUNT -- 001D        DATA --- 00D8        DECR --- 002F        E ------ 0064
GO ----- 00B3        HEAD --- 00D2        NEXT --- 00BB        NOT ---- 00E1
PAUSE - 00F8         RESET -- 00BA        SK ----- 00A5        SKIP --- 0012
TRANS -- 009F G      TWAIT -- 00A1        WAIT --- 000C
```

236 Source Lines    236 Assembled Lines    46685 Bytes available

>>> No assembly errors detected <<<

APPENDIX B

RECEIVER_CODE         Z80 Cross Assembler V4.0                    PROGRAM > FINAL

```
ADDR      CODE            ERR LINE        STATEMENT
                              1            TITLE RECEIVER_CODE
                              2     ;
                              3     ;
                              4     ;
B000                          5     ;
                              6            ORG     0B000H  ;  START OF CODE REGISTERS
07D8                          7    MAXBYT   EGU     1800    ;  MAX # OF BYTES IN BUFFER BEFORE ERROR
8180                          8    ORGCODE  EGU     08180H  ;  $8000
8700                          9    ENDCODE  EGU     08700H  ;  $8F00
03E8                         10    INITNUM  EGU     1000    ;  BYTES OF DATA TO INITIALIZE AVERAGE AND NOISE LEVELS
0064                         11    HEADR:   EGU     100     ;  BYTES OF DATA FOR FULL HEADER TO BE IN DATA BUFFER
0300                         12    FRAME:   EGU     300H    ;  BYTES OF DATA FOR FULL FRAME TO BE IN DATA BUFFER
                             13     ;
BDFF                         14    TOPRAM   EGU     0BDFFH  ;  INITIAL STACK POINTER  $BDFF
F7EB                         15    RSTBV    EGU     0F7EBH  ;  RESTART B VECTOR TO INT. STORE C3 IN F7EB , $00E4 IN $
F7F5                         16    URST     EGU     0F7F5H  ;  UNIDENTIFIED INTERRUPT VECTOR
A000                         17    RING     EGU     0A000H  ;  START OF DATA RING  $A000
0313                         18    PROMPT   EGU     313H    ;  MONITOR'S PROMPT  $313
0000                         19    AD       EGU     000H    ;  START ADDRESS OF A/D CONV
00C0                         20    SER      EGU     0C0H    ;  BASE ADDRESS OF SERIAL PORT
FB80                         21    PIA      EGU     0FB80H  ;  BASE ADDRESS OF SYSTEM PIA
FB80                         22    PADAT    EGU     PIA              ;  PORT A DATA
FB84                         23    PADDR    EGU     PIA + 4
FB85                         24    PBDDR    EGU     PIA + 5  ;  PORT B DDR
FB81                         25    PBDAT    EGU     PIA + 1  ;  PORT B DATA
FB89                         26    PBBC     EGU     PIA + 9  ;  PORT B BIT CLEAR
FB8D                         27    PBBS     EGU     PIA + 13        ;  PORT B BIT SET
B000                         28    NXTIN:   DEFS    2        ;  POINTER FOR INTERRUPT CODE TO STORE NEW DATA
B002                         29    NXTOUT:  DEFS    2        ;  POINTER FOR NEXT BYTE OF DATA TO BE READ
B004                         30    NBYTE:   DEFS    2        ;  NUMBER OF BYTES IN DATA BUFFER
B006                         31    EARLY:   DEFS    2        ;  SUM OF EIGHT BYTES CONSECUTIVE FROM NXTOUT & 1
B008                         32    LATE:    DEFS    2        ;  SUM OF EIGHT BYTES CONSECUTIVE FROM NXTOUT + 8
B00A                         33    AVERG:   DEFS    2        ;  AVERAGE SIGNAL LEVEL ( LEVEL IS IN HIGH BYTE )
B00C                         34    NOISE:   DEFS    2        ;  AVERAGE NOISE LEVEL
B00E                         35    MAXV:    DEFS    2        ;  MAXIMUM OF 10 LOCATIONS SEARCHED
B010                         36    MAXA:    DEFS    2        ;  ADDRESS OF LOCATION WITH MAXIMUM
B012                         37    SYNCHV:  DEFS    2        ;  MAXIMUM AT HEADER BIT
B014                         38    SYNCHA:  DEFS    2        ;  ADDRESS OF THE FIRST HEADER BIT
B016                         39    FOURSM:  DEFS    10       ;  FIVE SUMMING REGISTERS TO FIT THE ENTIRE HEADER
B020                         40    FOURSA:  DEFS    10       ;  FIVE ADDRESSES CORRESPONDING TO FOURSM
B02A                         41    HIL:     DEFS    2        ;  THE AMPLITUDE OF A FULL BIT ON
B02C                         42    LOWL:    DEFS    2        ;  THE AMPLITUDE OF A FULL BIT OFF
B02E                         43    TRIG:    DEFS    2        ;  THE TRIGGER VALUE FOR "SEEING" THE FIRST HEADER
B030                         44    DATAS:   DEFS    40       ;  THE 40 DATA BITS
B058                         45    STCHAR:  DEFS    80       ;  THE CHARACTER STRING TO BE SENT
B0A8                         46    CHARIN:  DEFS    2        ;  POINTER TO NEXT OPEN CHARACTER LOCATION
B0AA                         47    CHAR:    DEFS    2        ;  POINTER TO NEXT CHARACTER TO SEND
B0AC                         48    NCHAR:   DEFS    1        ;  NUMBER OF CHARACTERS REMAINING TO BE SENT
B0AD                         49    SPSAV:   DEFS    2        ;  STACK POINTER LOCATION
B0AF                         50    PASAV:   DEFS    1        ;  BYTE WITH A PORT OUTPUT DATA
B0B0                         51    ERROR:   DEFS    1        ;  ERROR REGISTER
B0B1                         52    INTFL:   DEFS    1        ;  FLAG FOR NON-REENTRANCY
B0B2                         53    COUNT:   DEFS    2        ;  COUNTER FOR RESET (ABOUT EVERY 30 MINUTES)
B0B4                         54    SPSV2:   DEFS    2        ;  ANOTHER STORAGE PLACE FOR STACK POINTER
                             55     ;
                             56     ;
                             57     ; THE ERROR REGISTER BITS REPRESENT THE FOLLOWING ERRORS:
                             58     ;      BIT
                             59     ;       0        FLAG FOR ERROR MESSAGE ALREADY SENT
                             60     ;       1        STACK POINTER ERROR
                             61     ;       2        RETURN ADDRESS NOT IN CODE
                             62     ;       3        TOO MANY DATA BYTES IN BUFFER (OVER MAXBYTE)
                             63     ;       4        EARLY REGISTER SUM IS INCORRECT
                             64     ;       5        SLOOP DID NOT BACK UP TO TARGET ADDRESS BEFORE COUNTER RAN OUT
                             65     ;       6        A/D CONVERTER HAD NOT COMPLETED CONVERSION YET
                             66     ;       7        STACK POINTER WAS NOT AT TOPRAM IN MATCH LOOP
                             67     ;
8000                         68            ORG     0E000H   ;  $E000
                             69     ;
                             70     ;
                             71     ; INT IS THE INTERRUPT HANDLING ROUTINE
                             72     ;
E000  08                     73    INT:     EX      AF,AF'          ;  SWITCH TO PRIMED REGISTERS
E001  D7                     74             EXX
                             75     ; NOW CHECK FOR STACK POINTER IN MONITOR AREA. IF SO, JUMP TO INIT
E002  ED 73 AD B0            76             LD      (SPSAV),SP
E006  2A AD B0                77             LD      HL,(SPSAV)
E009  CB 74                   78             BIT     6,H              ;  IF BIT 6 OF STACK POINTER SET, IN MONITOR
E00B  C2 14 E1                79             JP      NZ,JINIT
                             80     ;
E00E  3A B1 B0               81             LD      A,(INTFL)
E011  A7                      82             AND     A
E012  C2 27 E1                83             JP      NZ,REENT         ;  TEST FLAG FOR NON-REENTRANCY
E015  3C                      84             INC     A                ;  SET FLAG
E016  32 B1 B0                85             LD      (INTFL),A
E019  3A AF B0                86             LD      A,(PASAV)        ;  TOGGLE BIT 1 PORT A
E01C  EE 01                   87             XOR     01H
E01E  32 AF B0                88             LD      (PASAV),A
E021  32 80 FB                89             LD      (PADAT),A        ;  BIT TOGGLED
E024  3A 80 FB                90             LD      A,(PADAT)        ;  LOOK AT BIT 5 PORT A ( THE TEST SWITCH )
E027  CB 77                   91             BIT     6,A
E029  CA 19 E1                92             JP      Z,TEST           ;  SWITCH ON TEST? IF SO, THE VOLTAGE IS LOW.
                             93     ; IF TEST SWITCH IS SET, VECTOR 4MSEC INTERRUPTS TO PROMPT AND JUMP TO PROMPT
E02C  DB 01                  94             IN      A,(AD + 1)       ;  GET HIGH NIBBLE & STATUS
E02E  B7                      95             OR      A                ;  CHECK FOR CONVERSION COMPLETE
E02F  F2 2F E1                96             JP      P,ADERR          ;  IF NOT, THIS IS AN ERROR.
E032  5F                      97             LD      E,A              ;  SAVE HI NIBBLE FOR NOW
E033  DB 02                   98             IN      A,(AD + 2)       ;  GET LOW BYTE OF DATA
E035  57                      99             LD      D,A              ;  LOW BYTE INTO D
E036  7B                     100             LD      A,E              ;  HI BYTE BACK
E037  06 04                  101             LD      B,4
E039  CB 22                  102    INTL:    SLA     D
E03B  17                     103             RLA                       ;  SHIFT 8 MSB INTO ACC
E03C  10 FB                  104             DJNZ    INTL
E03E  2F                     105             CPL                       ;  INVERT DATA (A/D RETURNS INVERTED DATA)
```

```
803F  2A CO BO        106             LD      HL,(NXTIN)      ; GET DATAIN POINTER
8042  77              107             LD      (HL),A          ; STORE DATA INTO NEXTIN
8043  DB CO           108             IN      A,(AD)          ; RESET A/D
8045  3E EF           109             LD      A,8FH           ; CONVERT CHANNEL 15
8047  D3 C3           110             OUT     (AD + 3),A
8049  ED 5B 00 BO     111             LD      DE,(NXTIN)
804D  13              112             INC     DE              ; INCREMENT NEXTIN POINTER
804E  CB 9A           113             RES     3,D             ; FOR WRAPAROUND
8050  2A 02 BO        114             LD      HL,(NXTOUT)     ; COMPARE WITH NEXTOUT
8053  A7              115             AND     A               ; CLEAR CARRY
8054  ED 52           116             SBC     HL,DE
8056  CA 6C EO        117             JP      Z,CALCK         ;******* IF POINTERS ARE SAME,!!!!!!!!!!!!!!!!!
8059  ED 53 00 BO     118             LD      (NXTIN),DE      ; STORE NEW POINTER
805D  2A 04 BO        119             LD      HL,(NBYTE)      ; INCREMENT COUNTER FOR BYTES IN BUFFER
8060  23              120             INC     HL
8061  22 04 BO        121             LD      (NBYTE),HL
8064  7B              122             LD      A,E             ; RUN CKER EACH TIME LOW 4 BITS OF E ARE SET
8065  E6 OO           123             AND     OH              ;OFH &&& MASK HI BITS
8067  FE OO           124             CP      OH              ;OFH &&& CKER RUNS EVERY 16 INTERRUPTS
8069  C2 6F EO        125             JP      NZ,NOCHK
806C  CD 6C 81        126     CALCK:  CALL    CKER
806F  3A AC BO        127     NOCHK:  LD      A,(NCHAR)       ; CHECK FOR NEED TO SEND CHARACTERS
8072  A7              128             AND     A               ; TEST
8073  CA EF EO        129             JP      Z,NOSEND        ; IF NO CHARACTERS TO SEND, SKIP
8076  OE C3           130             LD      C,SER + 3
8078  ED 40           131             IN      B,(C)           ; CHECK SERIAL PORT STATUS REGISTER
807A  CB 78           132             BIT     7,B             ; TEST BIT 7
807C  CA 9E EO        133             JP      Z,NSEND2        ; IF CLEAR, NO ROOM IN CHARACTER BUFFER
807F  3D              134             DEC     A               ; SUBTRACT ONE FROM NCHAR
8080  32 AC BO        135             LD      (NCHAR),A       ; STORE NEW NCHAR
8083  2A AA BO        136             LD      HL,(CHAR)       ; GET POINTER TO NEXT CHARACTER TO SEND
8086  7E              137             LD      A,(HL)          ; GET THE CHARACTER TO SEND INTO A
8087  D3 CO           138             OUT     (SER),A         ; LOAD TRANSMIT BUFFER WITH CHARACTER
8089  23              139             INC     HL              ; INCREMENT CHARACTER POINTER
808A  22 AA BO        140             LD      (CHAR),HL       ; NEW POINTER STORED
808D  18 09           141             JR      NSEND2
808F  21 38 DO        142     NOSEND  LD      HL,STCHAR
8092  22 AA BO        143             LD      (CHAR),HL       , POINT CHARACTER POINTERS AT START OF STRING
8095  22 AB BO        144             LD      (CHARIN),HL
8098  3A DO BO        145     NSEND2  LD      A,(ERROR)       ; CHECK THE ERROR REGISTER
809B  A7              146             AND     A
809C  C4 D2 80        147             JP      Z,OK            , IF ZERO, NO ERRORS
809F  C3 14 81        148             JP      JINIT           , IF ERROR, RESET SYSTEM !!!!!!!!!!!!!!!!!!!!!!
80A2  CB 47           149             BIT     O,A             ; CHECK BIT O. IF SET, ERROR DATA ALREADY SENT
80A4  C2 15 81        150             JP      NZ,TEST         ;******** IF SO, JUMP TO PROMPT
80A7  2A AB BO        151             LD      HL,(CHARIN)     ; POINT TO NEXT EMPTY STRING LOCATION
80AA  3E OD           152             LD      A,13            ; SEND A CR
80AC  77              153             LD      (HL),A
80AD  23              154             INC     HL              , POINT TO NEXT LOCATION
80AE  3E OA           155             LD      A,OAH
80B0  77              156             LD      (HL),A          ; SEND A LF
80B1  23              157             INC     HL
80B2  3E 45           158             LD      A,'E'           ; SEND AN 'E'
80B4  77              159             LD      (HL),A
80B5  23              160             INC     HL
80B6  3A BO BO        161             LD      A,(ERROR)       ; SEND HEX ASCII OF ERROR REGISTER
80B9  CD 36 81        162             CALL    ATODE
80BC  73              163             LD      (HL),E          ; ATODE RETURNS HI NIBBLE IN E, LOW IN D
80BD  23              164             INC     HL              ; POINT TO NEXT CHAR
80BE  72              165             LD      (HL),D
80BF  23              166             INC     HL              ; POINT AT NEXT CHAR
80C0  22 AB BO        167             LD      (CHARIN),HL     ; POINT NEW CHARIN BEYOND STRING
80C3  3A AC BO        168             LD      A,(NCHAR)
80C6  C6 05           169             ADD     A,5             ; ADD 5 CHARS TO NCHAR.
80C8  32 AC BO        170             LD      (NCHAR),A
80CB  21 BO BO        171             LD      HL,ERROR
80CE  CB C6           172             SET     O,(HL)          ; SET BIT O IN ERROR REGISTER
80D0  18 42           173             JR      JINIT           ; !!!!!!!!!!!!!!!!!!!! RTI  ; DON'T TOGGLE LED
80D2  3A OO EO        174     OK:     LD      A,(NXTIN)       ; TOGGLE LED IF LOW BYTE OF NEXTIN = O
80D5  B7              175             OR      A
80D6  C2 FE 80        176             JP      NZ,RTI
80D9  3A AF BO        177     TOGGLE: LD      A,(PASAV)       ; GET SAVE REGISTER WITH CONTENTS OF PORT A
80DC  EE 80           178             XOR     8CH             ; TOGGLE BIT 7
80DE  32 AF BO        179             LD      (PASAV),A       ; STORE NEW SAVE REGISTER
80E1  32 BO F8        180             LD      (PADAT),A       ; SEND NEW VALUE TO PORT A
80E4  2A B2 BO        181             LD      HL,(COUNT)
80E7  23              182             INC     HL
80E8  22 B2 BO        183             LD      (COUNT),HL      ; STORE NEW COUNTER
80EB  11 00 08        184             LD      DE,0800H        ; SUBTRACT $800
80EE  A7              185             AND     A
80EF  ED 52           186             SBC     HL,DE
80F1  FA FE 80        187             JP      M,RTI           ; NOT TIME FOR SYSTEM RESET?
80F4  3A AC BO        188             LD      A,(NCHAR)       ; ANY CHARACTERS TO SEND?
80F7  A7              189             AND     A
80F8  C2 FE 80        190             JP      NZ,RTI          ; IF SO, DON'T RESET YET
80FB  C3 14 81        191             JP      JINIT           ; RESET SYSTEM
80FE  3E 20           192     RTI:    LD      A,20H           ; RESET AND ENABLE 244 HZ INTERRUPT
8100  32 89 F8        193             LD      (FB8C),A
8103  32 ED F8        194             LD      (F3B5),A
8106  ED 57           195             LD      A,I             ; CHECK INTERRUPT FLIP FLOP
8108  EA 14 81        196             JP      PE,JINIT        ; IF ENABLED, RESET SYSTEM!!!!!!!!!!!???
810B  3E 00           197             LD      A,0             ; RESET FLAG FOR NON-REENTRANCY
810D  32 B1 BO        198             LD      (INTFL),A
8110  D9              199             EXX                     ; EXCHANGE REGISTERS AGAIN
8111  08              200             EX      AF,AF'
8112  FB              201             EI                      ; ENABLE INTERRUPTS AGAIN
8113  C9              202             RET
                      203     ;
8114  D9              204     JINIT:  EXX                     ; KEEP REGISTERS STRAIGHT FOR JUMP TO INIT
8115  08              205             EX      AF,AF'
8116  C3 DC 81        206             JP      INIT
                      207     ;
                      208     ; TEST VECTORS THE 4MSEC INTERRUPT TO THE PROMPT HANDLER AND JUMPS TO PROMPT
8119  21 E4 00        209     TEST:   LD      HL,OOE4H        ; MONITOR'S VECTOR
811C  22 EC F7        210             LD      (RSTBV + 1),HL  ; INTO RAM VEC TABLE, ADD 1 SINCE JP INSTR. THER
811F  21 13 03        211             LD      HL,PROMPT       ; PUSH PROMPT ADDRESS FOR RETURN
8122  E5              212             PUSH    HL
8123  F3              213             DI                      ; DISABLE INTERRUPTS
8124  C3 FE 80        214             JP      RTI             ; GO TO PROMPT
                      215     ; REENT IS THE ERROR HANDLER FOR REENTRANT INTERRUPTS
8127  3E 2A           216     REENT:  LD      A,'*'           ; SEND AN ASTERISK
8129  CD 66 86        217             CALL    STRA
812C  F3              218             DI                      ; DISABLE INTERRUPTS !!!!!!!!!!!!!!!!!!!!!!!!!
812D  18 E5           219             JR      JINIT           ; RESET SYSTEM !!!!!!!!!!!!!!!!!!!!!!!!!!!!!!!
                      220     ; ADERR IS THE ERROR HANDLER FOR A/D CONVERSION NOT COMPLETE
```

```
812F  21 E0 B0      221  ADERR:  LD      HL,ERROR        ; SET BIT 6 IN ERROR REGISTER
8132  CB F6         222          SET     6,(HL)
8134  18 DE         223          JR      JINIT           ; !!!!!!!!!!!!!!!!!!!!!!!!!!!!!
                    224  ;
                    225  ; ATODE CONVERTS THE ACCUMULATOR TO TWO HEX ASCII CHARACTERS IN REGISTER PAIR DE
                    226  ; THE HIGH NIBBLE RETURNS IN E AND THE LOW IN D SO THAT THE CHARACTERS MAY BE
                    227  ; STORED IN CONSECUTIVE RAM LOCATIONS IN THE RIGHT ORDER WITH LD  XXXX,DE
                    228  ;
8136  1E 00         229  ATODE:  LD      E,0             ; CLEAR E INITIALLY
8138  CD 40 81      230          CALL    NIB             ; GET NIBBLE INTO D
813B  5A            231          LD      E,D             ; TRANSFER TO E
813C  CD 40 81      232          CALL    NIB             ; GET LOW NIBBLE INTO D
813F  C9            233          RET
8140  16 00         234  NIB:    LD      D,0             ; CLEAR D
8142  CB 27         235          SLA     A
8144  CB 12         236          RL      D
8146  CB 27         237          SLA     A
8148  CB 12         238          RL      D
814A  CB 27         239          SLA     A
814C  CB 12         240          RL      D
814E  CB 27         241          SLA     A
8150  CB 12         242          RL      D
8152  F5            243          PUSH    AF              ; SAVE DATA
8153  7A            244          LD      A,D             ; GET NIBBLE INTO ACC
8154  FE 0A         245          CP      10              ; LESS THAN 10?
8156  FA 5B 81      246          JP      M,LNIB
8159  C6 07         247          ADD     A,'A' - '9' - 1 ; ADD IN THE OFFSET
815B  C6 30         248  LNIB:   ADD     A,'0'           ; CONVERT TO ASCII
815D  57            249          LD      D,A             ; CHARACTER TO D
815E  F1            250          POP     AF              ; RETRIEVE DATA
815F  C9            251          RET
                    252  ;
                    253  ; CKER  CHECKS FOR SYSTEM ERRORS: MAKES SURE THE PROGRAM COUNTER IS
                    254  ;       WITHIN THE CODE, MAKES SURE THE STACK POINTER IS NOT TOO LOW,,
                    255  ;       MAKES SURE FEWER THAN MAXBYT BYTES ARE IN DATA BUFFER
                    256  ;
8160  2A 04 B0      257  CKER:   LD      HL,(NBYTE)
8163  11 08 07      258          LD      DE,MAXBYT
8166  A7            259          AND     A
8167  ED 52         260          SBC     HL,DE
8169  FA 71 81      261          JP      M,LT            ; NEGATIVE RESULT MEANS OK
816C  21 E0 B0      262          LD      HL,ERROR        ; POINT HL AT ERROR REG
816F  CB DE         263          SET     3,(HL)          ; SET BUFFER OVERFLOW FLAG
8171  D1            264  LT:     POP     DE              ; STRIP CKER RETURN ADDRESS OFF STACK
8172  E1            265          POP     HL              ; GET PROGRAM RETURN ADDRESS ******
8173  E5            266          PUSH    HL              ; MAKE SURE RETURN ADDRESS IS AT VALID CODE
8174  D5            267          PUSH    DE              ; RETURN CKER-RETURN ADDRESS
8175  11 80 81      268          LD      DE,ORGCODE      ; NOTICE, THIS WILL FLAG OUT IF THE 244 HZ
8178  A7            269          AND     A               ; IS VECTORED TO INT BUT THE MONITOR IS THE
8179  ED 52         270          SBC     HL,DE           ; CODE INTERRUPTED.
817B  FA EB 81      271          JP      M,TRBL          ; IF RETURN ADDRESS < CODE ORIGIN, ERROR
817E  E1            272          POP     HL              ; CKER RETURN ADDRESS
817F  D1            273          POP     DE              ; CODE RETURN ADDRESS *****
8180  D5            274          PUSH    DE              ; GET RETURN ADDRESS THIS TIME IN DE
8181  E5            275          PUSH    HL              ; RETURN CKER RET ADDR
8182  21 00 87      276          LD      HL,ENDCODE
8185  A7            277          AND     A
8186  ED 52         278          SBC     HL,DE           ; IF ENDCODE >= RET ADDR, OK
8188  F2 90 81      279          JP      P,VALIDA
818B  21 E0 B0      280  TRBL:   LD      HL,ERROR        ; POINT AT ERROR REGISTER
818E  CB D6         281          SET     2,(HL)          ; SET PROGRAM COUNTER ERROR
8190  21 A5 B2      282  VALIDA  LD      HL,MATCH        ; IN MATCH? %%%%%%DEBUGGGGG
8193  A7            283          AND     A
8194  ED 52         284          SBC     HL,DE
8196  F2 BD 81      285          JP      P,CHSTK         ; IF RET < MATCH, SKIP EARLY CHECK
8199  21 D9 B2      286          LD      HL,MATCH2
819C  A7            287          AND     A
819D  ED 52         288          SBC     HL,DE
819F  FA BD 81      289          JP      M,CHSTK         ; NOT IN MATCH  DON'T CHECK EARLY AND LATE
81A2  ED 5B 02 B0   290          LD      DE,(NXTOUT)     ; CHECK THAT EARLY IS CORRECT
81A6  21 00 00      291          LD      HL,0
81A9  06 08         292          LD      B,8
81AB  CD 98 82      293          CALL    EARL            ; GETS EARLY INTO HL
81AE  ED 5B 06 B0   294          LD      DE,(EARLY)      ; COMPARE WITH EARLY
81B2  A7            295          AND     A
81B3  ED 52         296          SBC     HL,DE
81B5  CA BD 81      297          JP      Z,CHSTK         ; IF EQUAL, OK
81B8  21 E0 B0      298          LD      HL,ERROR        ; IF NOT, SET FLAG
81BB  CB E6         299          SET     4,(HL)
81BD  2A AD B0      300  CHSTK   LD      HL,(SPSAV)      ; GET STACK POINTER LOCATION INTO HL
81C0  11 FF DC      301          LD      DE,TOPRAM - 256
81C3  A7            302          AND     A
81C4  ED 52         303          SBC     HL,DE           ; IF SP DEEPER THAN 256 BYTES, FLAG OUT ERROR
81C6  FA D6 81      304          JP      M,SPERR         ; IF NEGATIVE RESULT, STACK IS TOO DEEP
81C9  21 FD DD      305          LD      HL,TOPRAM - 2
81CC  ED 5B AD B0   306          LD      DE,(SPSAV)
81D0  A7            307          AND     A
81D1  ED 52         308          SBC     HL,DE
81D2  F2 DB 81      309          JP      P,VALSP         ; STACK ERROR?
81D5  21 E0 B0      310  SPERR   LD      HL,ERROR
81D8  CB CE         311          SET     1,(HL)          ; SET BIT FOR STACK POINTER ERROR
81DB  C9            312  VALSP   RET
                    313  ;
                    314  ;
                    315  ; INIT INITIALIZES REGISTERS, VECTORS THE 4MSEC INTERRUPT TO INT, AND ENABLES
                    316  ;      THE INTERRUPT
                    317  ;
81DC  F3            318  INIT    DI                      ; DISABLE INTERRUPTS
81DD  31 FF DD      319          LD      SP,TOPRAM
81E0  ED 73 AD B0   320          LD      (SPSAV),SP      ; STORE SP LOCATION IN SPSAV
81E4  21 00 A0      321          LD      HL,RING
81E7  22 02 B0      322          LD      (NXTOUT),HL
81EA  22 00 B0      323          LD      (NXTIN),HL              ; LOAD POINTERS TO START OF DATA RING
81ED  21 90 B0      324          LD      HL,STCHAR       ; POINT CHAR AT START OF STRING SPACE
81F0  22 AA B0      325          LD      (CHAR),HL       ; POINTER TO CHARACTER TO SEND
81F3  22 AE B0      326          LD      (CHARIN),HL     ; NEXT OPEN CHAR LOCATION
81F6  21 00 00      327          LD      HL,0
81F9  7C            328          LD      A,H
81FA  22 04 B0      329          LD      (NBYTE),HL
81FD  22 CC B0      330          LD      (NOISE),HL      ; CLEAR NOISE AND AVERAGE REGISTERS
```

```
8200  22 0A B0         331         LD      (AVERG),HL
8203  32 AC B0         332         LD      (NCHAR),A       ; PUT 0 AS NUMBER OF CHARACTERS TO SEND
8206  32 D0 B0         333         LD      (ERROR),A       ; CLEAR ERROR REGISTER
8209  22 E2 B0         334         LD      (COUNT),HL      ; CLEAR COUNT TO RESET REGISTER
820C  DB 00            335         IN      A,(AD)          ; RESET A/D
820E  3E FF            336         LD      A,8FH           ; CONVERT CHANNEL 15
8210  D3 03            337         OUT     (AD + 3),A
8212  3E 81            338         LD      A,81H           ; SET DDR PORTA FOR BIT 7 AND 0 OUTPUT, OTHERS I
8214  32 E4 F8         339         LD      (FADDR),A
8217  32 E0 F8         340         LD      (FADAT),A       ; TURN LED ON
821A  32 AF B0         341         LD      (FASAV),A       ; INITIALIZE COPY OF PORT A
821D  3E 04            342         LD      A,04H
821F  D3 CB            343         OUT     (0BBH),A        ; UNMASK RESETB INTERRUPT
8221  3E 7F            344         LD      A,7FH           ; SET PORT B DDR TO ALL OUTPUTS EXCEPT BIT 7
8223  32 E5 F8         345         LD      (FBDDR),A       ; FOR 244 HZ INTERRUPT
8226  3E 00            346         LD      A,0             ; SET BAUD RATE AT 1800
8228  D3 C2            347         OUT     (SER + 2),A
822A  3E 11            348         LD      A,11H           ; 7 BIT WORDS, 1 STOP BIT, NO PARITY
822C  D3 C2            349         OUT     (SER + 2),A
822E  3E 91            350         LD      A,91H
8230  D3 C2            351         OUT     (SER + 2),A
8232  3E 0A            352         LD      A,0AH           ; 1800 BAUD
8234  D3 C4            353         OUT     (SER + 4),A
8236  21 00 80         354         LD      HL,INT          ; VECTOR 244HZ INTERRUPT TO INT
8239  3E C3            355         LD      A,0C3H          ; JP INSTRUCTION
823B  32 E6 F7         356         LD      (RSTBV),A       ; RESTART B VECTOR
823E  22 EC F7         357         LD      (RSTBV + 1),HL  ; INT ADDRESS
8241  3E 00            358         LD      A,0
8243  32 B1 B0         359         LD      (INTFL),A       ; CLEAR FLAG FOR NON-REENTRANT INTERRUPT CODE
8246  3E 20            360         LD      A,20H           ; NOW RESET ENABLE
8248  32 E9 F8         361         LD      (FBBC),A        ; CLEAR BIT TO RESET INTERRUPT
824B  32 ED F8         362         LD      (FBBS),A        ; SET BIT TO ENABLE INTERRUPT
824E  FB               363         EI                      ; ENABLE INTERRUPTS
                       364 ;
                       365 ; INIT2 INITIALIZES THE AVERAGE LEVEL AND AVERAGE NOISE REGISTERS BY
                       366 ;       SCANNING THE FIRST INITNUM BYTES OF DATA WITHOUT LOOKING FOR A MATCH.
                       367 ;       INIT2 INITIALIZES THE EARLY AND LATE SUMMING REGISTERS AND SETS THE
                       368 ;       TRIGGER THRESHOLD LEVEL (THIS IS ALSO UPDATED EVERY 10 DATA BYTES).
                       369 ;
824F  21 E8 03         370 INIT2:  LD      HL,INITNUM
8252  ED 4B 04 B0      371         LD      BC,(NBYTE)
8256  A7               372         AND     A               ; CLEAR CARRY
8257  ED 42            373         SBC     HL,BC           ; AT LEAST INITNUM BYTES IN BUFFER?
8259  F2 4F 82         374         JP      P,INIT2         ; IF NOT, WAIT
825C  CD 74 82         375         CALL    SETRG           ; INITIALIZE EARLY AND LATE
825F  0E 04            376         LD      C,4
8261  06 FF            377 OUTL:   LD      B,0FFH          ; BC HAS LOOP CONTROL VARIABLES
8263  C5               378 INL:    PUSH    BC              ; SAVE LOOP COUNTERS
8264  CD 6F 83         379         CALL    UPDATE
8267  CD 2B 83         380         CALL    ADVANC          ;
826A  C1               381         POP     BC              ; RETRIEVE LOOP CONTROL
826B  10 F6            382         DJNZ    INL
826D  0D               383         DEC     C               ; OUTER LOOP COUNTER
826E  C2 61 82         384         JP      NZ,OUTL
8271  C3 A5 82         385 ENDIN2: JP      MATCH           ; LOOK FOR TRANSMISSION
                       386 ;
                       387 ; INITIALIZES THE EARLY AND LATE SUMMING REGISTERS
                       388 ;
8274  21 00 00         389 SETRG:  LD      HL,0
8277  22 06 B0         390         LD      (EARLY),HL
827A  22 08 B0         391         LD      (LATE),HL
827D  06 08            392         LD      B,8             ; INITIALIZE EARLY SUM REGISTER
827F  ED 5B 02 B0      393         LD      DE,(NXTOUT)
8283  CD 98 82         394         CALL    EARL
8286  22 06 B0         395         LD      (EARLY),HL
8289  21 00 00         396         LD      HL,0            ; CLEAR REGISTER AGAIN
828C  06 08            397         LD      B,8
828E  CD 98 82         398         CALL    EARL            ; CALL EARL FOR LATE
8291  22 08 B0         399         LD      (LATE),HL
8294  CD 95 83         400         CALL    THRESH          ; SET THRESHOLD LEVEL
8297  C9               401         RET
                       402 ;
8298  1A               403 EARL:   LD      A,(DE)          ; GET DATA
8299  85               404         ADD     A,L             ; ADD TO HL
829A  D2 9E 82         405         JP      NC,NCRY
829D  24               406         INC     H
829E  6F               407 NCRY:   LD      L,A             ; STORE ADDED DATA
829F  13               408         INC     DE              ; POINT AT NEXT DATA
82A0  CB 9A            409         RES     3,D             ; HANDLE BUFFER WRAPAROUND
82A2  10 F4            410         DJNZ    EARL
82A4  C9               411         RET
                       412
                       413
                       414 ;
                       415 ; MATCH SEARCHES THE DATA BUFFER FOR A TRANSMITTER HEADER BIT   IT LOOKS FOR
                       416 ;   A MAXIMUM OF DIFFERENCE IN THE SUMS OF TWO CONSECUTIVE HALF BITS OF DATA.
                       417 ;   THE HEADER PATTERN SHOULD LOOK LIKE:
                       418 ;           90 90 90 90 90 90 90 90 21 21 21 21 21 21 21 21
                       419 ;           90 90 90 90 90 90 90 90 21 21 21 21 21 21 21 21
                       420 ;           90 90 90 90 90 90 90 90 21 21 21 21 21 21 21 21
                       421 ;           90 90 90 90 90 90 90 90 21 21 21 21 21 21 21 21
                       422 ;   WHERE 90 REPRESENTS THE TRANSMITTER ON AND 21 REPRESENTS OFF.  THE ACTUAL
                       423 ;   NUMBERS WILL OBVIOUSLY VARY CONSIDERABLY ACCORDING TO NOISE LEVELS AND
                       424 ;   TRANSMISSION STRENGTH, BUT THE PATTERN SHOULD BE SYMMETRIC WITH 8 HIGHER
                       425 ;   VALUES FOLLOWED BY 8 LOWER VALUES.
                       426 ;
                       427 ;   MATCH MOVES THROUGH 10 LOCATIONS AT A TIME LOOKING FOR THE MAXIMUM
                       428 ;   DIFFERENCE BETWEEN THE FIRST AND LAST HALVES OF THE SUBSEQUENT 16 DATA
                       429 ;   BYTES.  ONCE THE MAXIMUM FOR THESE 10 LOCATIONS IS FOUND, MATCH COMPARES
                       430 ;   THE SUM WITH A TRIGGER VALUE OBTAINED FROM THE AVERAGE NOISE LEVEL.
                       431 ;
                       432 ;   AS A TRIAL VALUE, THE TRIGGER NOISE LEVEL IS SET TO 8 TIMES THE NOISE
                       433 ;   LEVEL, WHICH IS THEN MULTIPLIED BY ANOTHER FACTOR OF 8 SINCE 8 DATA BYTES
                       434 ;   ARE SUMMED TO GET THE AMPLITUDE   FINALLY, A SMALL OFFSET OF 9 IS ADDED
                       435 ;   TO THE TRIGGER THRESHOLD SO THAT THE TRIGGER IS > 0 IF THE AVERAGE NOISE
                       436 ;   IS ZERO.  THIS MAY NOT BE NECESSARY, BUT IT DOESN'T HURT ANYTHING.
                       437 ;
                       438 ;   MATCH CHECKS 10 CONSECUTIVE LOCATIONS AT A TIME BECAUSE THIS REPRESENTS
                       439 ;   A FAIR CHUNK OF DATA YET ASSURES THAT ONLY ONE MAXIMUM WILL BE PRESENT
                       440 ;   IN THE AREA SEARCHED (THE MAXIMUMS FOR THE HEADER BITS WILL BE 16 BYTES
```

```
                441   ;   APART).
                442   ;
                443   ;   MATCH USES THE RAM REGISTERS
                444   ;       NBYTE   COUNTER FOR HOW MANY BYTES REMAIN IN THE DATA BUFFER
                445   ;       NXTOUT  POINTER TO THE FIRST DATA BYTE IN THE 16 BYTES OF INTEREST.
                446   ;               IT IS CALLED NXTOUT BECASE IT WILL BE THE NEXT DATA BYTE
                447   ;               SUBTRACTED FROM THE EARLY SUMMING REGISTER AS THE MATCH COMPARE
                448   ;               ADVANCES ONE MORE POSITION.
                449   ;       EARLY.  EARLY IS THE SUM OF THE 8 CONSECUTIVE DATA BYTES STARTING WITH
                450   ;               THE ONE POINTED TO BY NXTOUT.  IT IS CALLED EARLY BECAUSE IT
                451   ;               REPRESENTS DATA STORED IN THE BUFFER AT AN EARLIER TIME THAN
                452   ;               THAT SUMMED IN THE LATE REGISTER
                453   ;       LATE    LATE IS THE SUM OF THE 8 CONSECUTIVE DATA BYTES STARTING WITH
                454   ;               THE ONE 8 BYTES HIGHER THAN THAT POINTED TO BY NXTOUT.
                455   ;       MAXV    MAXV IS THE MAXIMUM OF THE DIFFERENCE BETWEEN EARLY AND LATE
                456   ;               IN THE 10 LOCATIONS SEARCHED
                457   ;       MAXA    MAXA IS THE ADDRESS OF THE DATA WHERE MAXV OCCURS
                458   ;       TRIG    TRIG IS THE THRESHOLD LEVEL WHICH INDICATES IF MAXV IS LARGE
                459   ;               ENOUGH TO TRIGGER A FURTHER CHECK FOR THE OTHER 3 HEADER BITS.
                460   ;
82A5 21 64 00   461   MATCH: LD       HL,HEADR       ; ENSURE AT LEAST 100 BYTES IN BUFFER
82A8 ED 4B 04 B0 462          LD      BC,(NBYTE)
                463          LD       A,1
                464          JP       PO,PROMPT      ; IF INTERRUPTS MASKED, JUMP TO PROMPT
82AC A7         465          AND      A              ; CLEAR CARRY
82AD ED 42      466          SBC      HL,BC          ; 100 - BYTES IN BUFFER
82AF FA D9 82   467          JP       M,MATCH2       ; TIGHT LOOP HERE
82B2 ED 73 04 B0 468         LD       (SPSV2),SP
82B6 2A 04 B0   469          LD       HL,(SPSV2)
82B9 11 FF BD   470          LD       DE,TOFRAM      ; TEST FOR STACK POINTER WANDERING
82BC A7         471          AND      A
82BD ED 52      472          SBC      HL,DE
82BF CA A5 82   473          JP       Z,MATCH
82C2 3A B4 B0   474          LD       A,(SPSV2)
82C5 CD 36 B1   475          CALL     ATODE
82C8 7B         476          LD       A,E
82C9 CD 66 B4   477          CALL     STRA
82CC 7A         478          LD       A,D
82CD CD 66 B4   479          CALL     STRA
82D0 21 E0 B0   480          LD       HL,ERROR
82D3 CB FE      481          SET      7,(HL)         ; IF STACK POINTER IS NOT WHERE IT SHOULD BE, ER
82D5 F3         482          DI
82D6 C3 13 03   483          JP       PROMPT         ; !!!!!!!!!!!!!!!!!!!!!!!!!!!!!!!!!!!!!
82D9 21 00 00   484   MATCH2 LD      HL,0
82DC 22 0E B0   485          LD       (MAXV),HL      ; CLEAR MAXVALUE
82DF 06 CA      486          LD       B,10           ; SEARCH 10 LOCATIONS
82E1 CD FC 82   487          CALL     SEARCH
82E4 CD 95 83   488          CALL     THRESH         ; SET TRIGGER LEVEL
82E7 2A 0E B0   489          LD       HL,(MAXV)      ; CHECK FOR TRIGGER IN THESE 10 BYTES
82EA ED 5B 2E B0 490         LD       DE,(TRIG)
82EE A7         491          AND      A              ; CLEAR CARRY
82EF ED 52      492          SBC      HL,DE          ; ABOVE THRESHOLD?
82F1 FA A5 82   493          JP       M,MATCH        ; NO
82F4 06 03      494          LD       B,3            ; CHECK THE NEXT THREE CELLS FOR MAX
82F6 CD FC 82   495          CALL     SEARCH         ; THIS IS NECESSARY BECAUSE THE MAX FOUND IN
82F9 C3 C6 83   496          JP       SYNCH          ; THE LOOP OF 10 LOCATIONS MAY NOT BE THE REAL
                497   ;                              ; MAXIMUM. THAT IS, THE HEADER BIT MAY ACTUALLY
                498   ;                                START A BYTE OR TWO AFTER THE END OF THE 10
                499   ;                                LOCATIONS SEARCHED.
                500   ;
82FC C5         501   SEARCH: PUSH    BC             ; SAVE LOOP COUNTER
82FD CD 6F 83   502          CALL     UPDATE         ; UPDATE AVERAGE & NOISE REGISTERS
8300 CD 2B 83   503          CALL     ADVANC         ; MOVE ONE AHEAD
8303 ED 5B 08 B0 504         LD       DE,(LATE)
8307 2A 06 B0   505          LD       HL,(EARLY)
830A A7         506          AND      A              ; CLEAR CARRY
830B ED 52      507          SBC      HL,DE          ; GET (SUMEARLY - SUMLATE)
830D E5         508          PUSH     HL             ; SAVE RESULT
830E ED 5B 0E B0 509         LD       DE,(MAXV)      ; GET PREVIOUS MAXVALUE
8312 A7         510          AND      A              ; CLEAR CARRY
8313 ED 52      511          SBC      HL,DE          ; COMPARE NEW SUM WITH CURRENT MAX
8315 FA 26 83   512          JP       M,LESS         ; IF NEW SUM < OLD MAX, KEEP OLD
8318 E1         513          POP      HL             ; NEW MAX
8319 22 0E B0   514          LD       (MAXV),HL      ; STORE NEW MAX
831C 2A 02 B0   515          LD       HL,(NXTOUT)    ; STORE CORRESPONDING ADDRESS
831F 22 10 B0   516          LD       (MAXA),HL
8322 C1         517          POP      BC             ; RETRIEVE COUNTER
8323 10 D7      518          DJNZ     SEARCH
8325 C9         519          RET                     ; IF THROUGH LOOP, RETURN
8326 E1         520   LESS:   POP     HL             ; CLEAN UP STACK
8327 C1         521          POP      BC             ; RETRIEVE COUNTER
8328 10 D2      522          DJNZ     SEARCH
832A C9         523          RET
                524   ;
                525   ;  ADVANCE_SUBROUTINE
                526   ;    ADVANCE MOVES ONE BYTE AHEAD
                527   ;
832B ED 4B 02 B0 528   ADVANC: LD     BC,(NXTOUT)    ; BC POINTS AT DATA
832F 0A         529          LD       A,(BC)         ; GET DATA INTO ACC
8330 5F         530          LD       E,A            ; PUT DATA INTO DE
8331 16 00      531          LD       D,0
8333 2A 06 B0   532          LD       HL,(EARLY)     ; GET SUMEARLY INTO HL
8336 A7         533          AND      A              ; CLEAR CARRY
8337 ED 52      534          SBC      HL,DE          ; SUBTRACT ELEMENT FROM SUMEARLY
8339 CD 60 83   535          CALL     COPNT          ; MOVE POINTER AHEAD 8, DATA INTO DE
833C 19         536          ADD      HL,DE          ; HL NOW CONTAINS NEW SUMEARLY
833D 22 06 B0   537          LD       (EARLY),HL
8340 2A 08 B0   538          LD       HL,(LATE)      ; GET SUMLATE INTO HL
8343 A7         539          AND      A              ; CLEAR CARRY
8344 ED 52      540          SBC      HL,DE          ; SUBTRACT DATA FROM SUMLATE
8346 CD 60 83   541          CALL     COPNT          ; GO TO NEXT DATA (8 AHEAD)
8349 19         542          ADD      HL,DE          ; HL NOW CONTAINS NEW SUMLATE
834A 22 08 B0   543          LD       (LATE),HL      ; STORE IT
834D ED 4B 02 B0 544         LD       BC,(NXTOUT)    ; INCREMENT NEXTOUT POINTER
8351 03         545          INC      BC
8352 CB 98      546          RES      3,B            ; CLEAR WRAPAROUND BIT
8354 ED 43 02 B0 547         LD       (NXTOUT),BC    ; REPLACE POINTER
8358 2A 04 B0   548          LD       HL,(NBYTE)     ; SUBTRACT BYTE FROM # IN BUFFER
835B 2B         549          DEC      HL
835C 22 04 B0   550          LD       (NBYTE),HL     ; STORE NEW BYTES IN BUFFER COUNTER
```

```
835F  C9              551  ENDAD:  RET
                      552  ;
                      553  ;
                      554  ;       SUBROUTINE GOPNT
                      555  ;  EXPECTS:  POINTER TO DATA RING IN REGISTER BC
                      556  ;  FUNCTION: MOVES POINTER 8 BYTES AHEAD, HANDLING WRAPAROUND AT EOB
                      557  ;            RETURNS WITH DATA AT NEW LOCATION IN REGISTER DE
                      558  ;  REGISTERS:   CHANGES ACCUMULATOR, BC, DE
8360  3E 08           559  GOPNT:  LD      A,8
8362  81              560          ADD     A,C             ; ADD OFFSET
8363  D2 69 83        561          JP      NC,SKIP
8366  04              562          INC     B               ; POSSIBLE WRAPAROUND
8367  CB 98           563          RES     3,B             ; CLEAR BIT 3 (2K DATA RING)
8369  4F              564  SKIP:   LD      C,A             ; STORE RESULT INTO BC
836A  0A              565          LD      A,(BC)          ; GET DATA
836B  5F              566          LD      E,A             ; STORE INTO E
836C  AF              567          XOR     A               ; CLEAR ACC
836D  57              568          LD      D,A             ; STORE 0 INTO D
836E  C9              569          RET
                      570  ;
                      571  ;       UPDATE UPDATES THE AVERAGE LEVEL AND NOISE AVERAGING REGISTERS
                      572  ;
836F  ED 4B 02 B0     573  UPDATE: LD      BC,(NXTOUT)     ; POINT BC AT DATA
8373  2A CA B0        574          LD      HL,(AVERG)      ; LOAD HL WITH AVERAGE DATA STUFF
8376  0A              575          LD      A,(BC)          ; GET DATA INTO ACC
8377  94              576          SUB     H               ; SUBTRACT HIGH BYTE OF AVERAGE FROM DATA
8378  4F              577          LD      C,A             ; SAVE FOR NOISE REGISTER PART
8379  5F              578          LD      E,A             ; EXTEND A TO SIGNED DE
837A  87              579          ADD     A,A             ; MOVE SIGN BIT TO CARRY
837B  9F              580          SBC     A,A             ; SUBTRACT SIGN BIT FROM ZERO
837C  57              581          LD      D,A             ; EXTEND 8 BITS TO 16 BITS SIGNED
837D  19              582          ADD     HL,DE           ; ADD TO AVERAGE REGISTER
837E  22 CA B0        583          LD      (AVERG),HL      ; STORE NEW AVERAGE REGISTER
8381  79              584          LD      A,C             ; RETRIEVE DATA-AVERAGE
8382  B7              585          OR      A               ; TEST FOR + OR -
8383  F2 88 83        586          JP      P,POZ
8386  ED 44           587          NEG                     ; NEGATE THE NEG REGISTER ( ABS VALUE )
8388  2A CC B0        588  POZ:    LD      HL,(NOISE)
838B  94              589          SUB     H               ; PERFORM :DATA-AVE: - NOISE AVE
838C  5F              590          LD      E,A             ; EXTEND SIGNED ACC TO 16 BIT DE
838D  87              591          ADD     A,A
838E  9F              592          SBC     A,A
838F  57              593          LD      D,A
8390  19              594          ADD     HL,DE           ; ADD IN TO NOISE REGISTER SUM
8391  22 CC B0        595          LD      (NOISE),HL      ; STORE NEW NOISE REGISTER
8394  C9              596          RET
                      597  ;
                      598  ;       THRESHOLD SUBROUTINE
                      599  ;  SETS TRIGGER THRESHOLD LEVEL, RETURNS LEVEL IN (TRIG) AND IN DE
                      600  ;
8395  3A CD B0        601  THRESH: LD      A,(NOISE +1)    ; LOOK AT HI BYTE OF NOISE
8398  5F              602          LD      E,A
8399  16 00           603          LD      D,0             ; EXTEND AVE NOISE TO 16 BIT DE
839B  3A 60 F8        604          LD      A,(PADAT)
839E  CB 6F           605          BIT     5,A             ; LOOK AT MODE SWITCH
83A0  CA A7 83        606          JP      Z,THRSK         ; TEST IT
83A3  CB 23           607          SLA     E               ; IF SWITCH IS UP, THRESHOLD IS 4X NOISE
83A5  CB 12           608          RL      D               ; GET 64 TIMES NOISE ( 8X FOR SUM, THEN 8X MORE)
83A7  CB 23           609  THRSK:  SLA     E
83A9  CB 12           610          RL      D               ; 4X
83AB  CB 23           611          SLA     E
83AD  CB 12           612          RL      D               ; 8X
83AF  CB 23           613          SLA     E
83B1  CB 12           614          RL      D               ; 16X
83B3  CB 23           615          SLA     E
83B5  CB 12           616          RL      D               ; 32X
83B7  CB 23           617          SLA     E
83B9  CB 12           618          RL      D               ; 64X
83BB  7B              619          LD      A,E             ; ADD SMALL CONSTANT OFFSET
83BC  C6 09           620          ADD     A,9             ; NO WORRY OF CARRY, ALREADY SHIFTED 6 LEFT.
83BE  5F              621          LD      E,A             ; LOAD SUM BACK INTO E
83BF  CB BA           622          RES     7,D             ; CLEAR SIGN BIT OF THRESHOLD ; MUST BE PPOS
83C1  ED 53 2E B0     623          LD      (TRIG),DE
83C5  C9              624          RET
                      625  ;
                      626  ;
                      627  ;       SYNCH LOOKS FOR FOUR SYNCH PULSES WITHIN 2 CELLS EACH WAY OF
                      628  ;       THE FIRST PULSE FOUND.  EACH OF THE FOUR PULSES MUST BE ABOVE
                      629  ;       THE SYNCH VALUE FOR A POSITIVE FIT.
                      630  ;
83C6  1E CF           631  SYNCH:  LD      E,15            ; SAFETY COUNTER FOR BACKUP TO LOCATE OLD MAXADD
83C8  CD 6A 84        632          CALL    SLOOP           ; BACK UP TO MAXIMUM
83CB  CD E9 84        633          CALL    BACKUP          ; BACK UP TWO CELLS FROM MAXA POINT
83CE  CD E9 84        634          CALL    BACKUP
83D1  21 16 B0        635          LD      HL,FOURSM       ; POINT AT FIRST OF 5 SUMMING REGISTERS
83D4  1E 0A           636          LD      E,10            ; CLEAR 5 SUMMING REGISTERS
83D6  36 00           637  CLEAR:  LD      (HL),0
83D8  23              638          INC     HL
83D9  10 FB           639          DJNZ    CLEAR
83DB  2A 02 B0        640          LD      HL,(NXTOUT)
83DE  22 20 B0        641          LD      (FOURSM + 10),HL ; GET ADDRESS OF CURRENT POSITION
83E1  23              642          INC     HL
83E2  22 22 B0        643          LD      (FOURSM + 12),HL
83E5  23              644          INC     HL
83E6  22 24 B0        645          LD      (FOURSM + 14),HL ; STORE ADDRESSES FOR THE 5 POSITIONS
83E9  23              646          INC     HL
83EA  22 26 B0        647          LD      (FOURSM + 16),HL
83ED  23              648          INC     HL
83EE  22 28 B0        649          LD      (FOURSM + 18),HL
83F1  DD 21 16 B0     650          LD      IX,FOUREM       ; POINT INDEX X AT ARRAY
                      651  ;
83F5  06 04           652          LD      B,4             ; SEARCH FOR 4 PULSES
83F7  C5              653  CHL1:   PUSH    BC              ; OUTER LOOP
83F8  CD 45 84        654          CALL    ADD5
83FB  DD 21 16 B0     655          LD      IX,FOUREM       ; POINT IX AT START OF SUMMING ARRAY AGAIN
83FF  06 0B           656          LD      B,11
8401  C5              657  CHL2:   PUSH    BC              ; SAVE COUNTER
8402  CD 2B 83        658          CALL    ADVANC          ; MOVE 11 POSITIONS AHEAD TO NEXT PULSE START
8405  C1              659          POP     BC
8406  10 F9           660          DJNZ    CHL2            ; INNER LOOP
```

```
8408  C1              661         POP     BC              ; OUTER LOOP
8409  10 EC           662         DJNZ    CHL1
                      663   ;
840B  DD 21 16 B0     664         LD      IX,FOURSM       ; NOW FIND THE MAX OF THE 5 SUMMING REGISTERS
840F  2A 20 B0        665         LD      HL,(FOURSM + 10)
8412  22 14 B0        666         LD      (SYNCHA),HL
8415  2A 16 B0        667         LD      HL,(FOURSM)     ; PUT FIRST SUM INTO SYNCHVALUE REGISTER
8418  22 12 B0        668         LD      (SYNCHV),HL
841B  06 04           669         LD      B,4             ; COMPARE WITH OTHER FOUR SUM REGISTERS
841D  C5              670 CHL3:   PUSH    BC
841E  DD 23           671         INC     IX
8420  DD 23           672         INC     IX              ; POINT INDEX REGISTER AT NEXT SUM REGISTER
8422  DD 5E 00        673         LD      E,(IX)          ; GET LOW BYTE OF SUM INTO E
8425  DD 56 01        674         LD      D,(IX + 1)      ; GET HI BYTE OF SUM INTO D
8428  2A 12 B0        675         LD      HL,(SYNCHV)     ; GET CURRENT SYNCHVALUE
842B  A7              676         AND     A
842C  ED 52           677         SBC     HL,DE           ; OLD VALUE - NEW VALUE
842E  F2 3F 84        678         JP      P,NEXT1         ; IF OLD >= NEW, DO NOTHING
8431  ED 53 12 B0     679         LD      (SYNCHV),DE     ; STORE NEW SYNCHVALUE
8435  DD 5E 0A        680         LD      E,(IX + 10)     ; GET NEW SYNCH ADDRESS
8438  DD 56 0B        681         LD      D,(IX + 11)
843B  ED 53 14 B0     682         LD      (SYNCHA),DE     ; STORE IT
843F  C1              683 NEXT1:  POP     BC              ; RETRIEVE COUNTER
8440  10 DB           684         DJNZ    CHL3
8442  C3 DA 84        685         JP      CHECK2          ; CHECK FOR ALL ABOVE THRESHOLD, PROCESS DATA
                      686   ;
                      687   ;
                      688   ; ADD5 SUBROUTINE MOVES THROUGH 5 POSITIONS IN A ROW AND ADDS THE VALUES OF
                      689   ;   THE DIFFERENCE BETWEEN SUMEARLY AND SUMLATE TO THE CORRESPONDING ARRAY
                      690   ;   ELEMENT.
                      691   ;
8445  06 05           692 ADD5:   LD      B,5
8447  C5              693 ADDL:   PUSH    BC              ; SAVE COUNTER
8448  ED 5B C8 B0     694         LD      DE,(LATE)
844C  2A 06 B0        695         LD      HL,(EARLY)
844F  A7              696         AND     A
8450  ED 52           697         SBC     HL,DE           ; GET SUMEARLY - SUMLATE
8452  DD 5E 00        698         LD      E,(IX)
8455  DD 56 01        699         LD      D,(IX + 1)      ; GET FOURSUM VALUE FOR CURRENT POSITION
8458  19              700         ADD     HL,DE           ; ADD SUMEARLY - SUMLATE TO FOURSUM
8459  DD 75 00        701         LD      (IX),L
845C  DD 74 01        702         LD      (IX + 1),H      ; STORE NEW FOURSUM VALUE
845F  CD 2B 83        703         CALL    ADVANC          ; MOVE AHEAD ONE STEP
8462  DD 23           704         INC     IX
8464  DD 23           705         INC     IX              ; POINT AT NEXT FOURSUM REGISTER
8466  C1              706         POP     BC
8467  10 DE           707         DJNZ    ADDL
8469  C9              708         RET
                      709   ;
                      710   ; SLOOP SUBROUTINE BACKS UP THE DATA POINTER UNTIL IT POINTS TO THE
                      711   ;   ADDRESS IN MAXA, OR UNTIL THE COUNTER IN B HAS RUN OUT.  IF THE COUNTER
                      712   ;   RUNS OUT FIRST, A BIT IS SET IN THE ERROR REGISTER AND SLOOP RETURNS THE
                      713   ;   POINTER B CELLS BACK FROM THE ORIGINAL POINTER.
                      714   ;
846A  C5              715 SLOOP:  PUSH    BC
846B  ED 5B 02 B0     716         LD      DE,(NXTOUT)
846F  2A 10 B0        717         LD      HL,(MAXA)       ; COMPARE PRESENT POSITION WITH MAX ADDRESS
8472  A7              718         AND     A
8473  ED 52           719         SBC     HL,DE           ; CHECK FOR EQUAL
8475  7C              720         LD      A,H
8476  B5              721         OR      L               ; =?
8477  CA 87 84        722         JP      Z,OUT
847A  CD 89 84        723         CALL    BACKUP          ; BACK UP A STEP
847D  C1              724         POP     BC              ; RETRIEVE COUNTER
847E  10 EA           725         DJNZ    SLOOP
8480  2A B0 B0        726         LD      HL,(ERROR)
8483  CB EE           727         SET     5,(HL)          ; ERROR!! NO MATCH FOUND ****************
8485  18 01           728         JR      BGO             ; CONTINUE
8487  C1              729 OUT:    POP     BC              ; CLEAN UP STACK
8488  C9              730 BGO:    RET
                      731   ;
                      732   ;
                      733   ;
                      734   ; BACKUP MOVES THE MATCH COMPARE BACK ONE STEP.
                      735   ;
8489  16 00           736 BACKUP: LD      D,0             ; CLEAR D REG *****
848B  ED 4B 02 B0     737         LD      BC,(NXTOUT)     ; POINT BC AT NEXTOUT
848F  3E 0F           738         LD      A,15            ; ADD 15 TO BC TO SUBTRACT LAST ADDED IN
8491  81              739         ADD     A,C
8492  D2 98 84        740         JP      NC,SKIP2
8495  04              741         INC     B
8496  CB 98           742         RES     3,B
8498  4F              743 SKIP2:  LD      C,A             ; STORE LOW BYTE
8499  0A              744         LD      A,(BC)          ; PUT DATA INTO ACC
849A  5F              745         LD      E,A             ; LOAD DATA INTO DE
849B  2A 08 B0        746         LD      HL,(LATE)       ; SUBTRACT DE FROM SUMLATE
849E  A7              747         AND     A               ; CLEAR CARRY
849F  ED 52           748         SBC     HL,DE
84A1  CD C1 84        749         CALL    BPOINT          ; MOVE POINTER 8 BACK, DATA TO DE
84A4  19              750         ADD     HL,DE           ; ADD DATA TO SUMLATE
84A5  22 08 B0        751         LD      (LATE),HL       ; STORE SUMLATE
84A8  2A 06 B0        752         LD      HL,(EARLY)      ; SUBTRACT DATA FROM SUMEARLY
84AB  A7              753         AND     A               ; CLEAR CARRY
84AC  ED 52           754         SBC     HL,DE
84AE  CD C1 84        755         CALL    BPOINT          ; POINTER 8 MORE BACK, DATA TO DE
84B1  19              756         ADD     HL,DE           ; ADD TO SUMEARLY
84B2  22 06 B0        757         LD      (EARLY),HL      ; STORE SUMEARLY
84B5  ED 43 02 B0     758         LD      (NXTOUT),BC     ; STORE NEW NEXTOUT INTO NEXTOUT
84B9  2A 04 B0        759         LD      HL,(NBYTE)
84BC  23              760         INC     HL              ; ADD 1 TO BYTES IN BUFFER
84BD  22 04 B0        761         LD      (NBYTE),HL
84C0  C9              762 ENDBA:  RET
                      763   ;
                      764   ;
                      765   ; BPOINT SUBROUTINE
                      766   ;   EXPECTS: POINTER TO DATA IN BC, DATA AT NEW POSITION TO RETURN IN DE
                      767   ;
                      768   ;
84C1  79              769 BPOINT: LD      A,C             ; SUBTRACT 8 FROM LOW BYTE OF POINTER
84C2  D6 08           770         SUB     8
```

```
84C4  4F              771            LD      C,A             ; STORE RESULT IN C
84C5  D2 D5 84        772            JP      NC,SKIP3
84C8  05              773            DEC     B               ; BORROW FROM B?
84C9  78              774            LD      A,B             ; TEST FOR LOW NIBBLE = $0F
84CA  E6 0F           775            AND     0FH
84CC  FE 0F           776            CP      0FH
84CE  C2 D5 84        777            JP      NZ,SKIP3        ; NOT = $0F ?
84D1  3E 06           778            LD      A,B             ; ADD 8 TO B FOR BUFFER ROLLOVER
84D3  80              779            ADD     A,B
84D4  47              780            LD      B,A             ; STORE NEW HI BYTE
84D5  0A       781   SKIP3:          LD      A,(BC)          ; GET DATA AT NEW POINTER
84D6  5F              782            LD      E,A             ; PUT DATA BYTE INTO E
84D7  16 00           783            LD      D,0             ; CLEAR HI BYTE
84D9  C9              784            RET                     ; DONE
                      785   ;
                      786   ;    CHECK2 MOVES THE COMPARE PATTERN BACK TO THE SYNCH POINT, CHECKS EACH
                      787   ;         OF THE FOUR HEADER PULSES FOR BEING ABOVE THE THRESHOLD, AND MEASURES
                      788   ;         THE AMPLITUDE OF THE HIGH AND LOW PULSES FOR COMPARISON WITH THE DATA.
                      789   ;
84DA  2A 14 B0        790   CHECK2:  LD      HL,(SYNCHA)     ; LOAD SYNCH ADDRESS INTO MAXA
84DD  22 10 B0        791            LD      (MAXA),HL
84E0  06 60           792            LD      B,96
84E2  CD 6A 84        793            CALL    SLOOP           ; BACK UP TO SYNCH ADDRESS WITH SAFETY COUNTER
84E5  21 00 00        794            LD      HL,0
84E8  22 2C B0        795            LD      (LOWL),HL       ; CLEAR HIGH AND LOW LEVEL REGISTERS.
84EB  22 2A B0        796            LD      (HIL),HL
84EE  06 04           797            LD      B,4             ; CHECK ALL FOUR HEADER PULSES
84F0  CB 40           798   CHL4:    BIT     0,B             ; AVERAGE IN LOWL AND HIL FOR 2 OF THE FOUR
84F2  CA 0B 85        799            JP      Z,CHK
84F5  ED 5B 08 B0     800            LD      DE,(LATE)       ; SET LOW LEVEL
84F9  2A 2C B0        801            LD      HL,(LOWL)       ; GET PREVIOUS LOWL VALUE
84FC  19              802            ADD     HL,DE
84FD  22 2C B0        803            LD      (LOWL),HL       ; STORE SUM
8500  ED 5B 06 B0     804            LD      DE,(EARLY)
8504  2A 2A B0        805            LD      HL,(HIL)        ; SET HIGH LEVEL
8507  19              806            ADD     HL,DE
8508  22 2A B0        807            LD      (HIL),HL
850B  ED 5B 08 B0     808   CHK:     LD      DE,(LATE)       ; CHECK PULSE FOR ABOVE THRESHOLD
850F  2A 06 B0        809            LD      HL,(EARLY)
8512  A7              810            AND     A               ; CLEAR CARRY
8513  ED 52           811            SBC     HL,DE           ; (EARLY - LATE)
8515  ED 5B 2E B0     812            LD      DE,(TRIG)
8519  A7              813            AND     A
851A  ED 52           814            SBC     HL,DE           ; (EARLY - LATE) - TRIG
851C  FA 3C 85        815            JP      M,NOGO          ; IF < 0, BELOW THRESHOLD
851F  C5              816            PUSH    BC              ; SAVE COUNTER
8520  06 10           817            LD      B,16
8522  C5              818   CHL5:    PUSH    BC              ; ADVANCE TO NEXT PULSE
8523  CD 2B 83        819            CALL    ADVANC
8526  C1              820            POP     BC
8527  10 F9           821            DJNZ    CHL5            ; INNER LOOP
8529  C1              822            POP     BC
852A  10 C4           823            DJNZ    CHL4            ; OUTER LOOP
852C  21 00 03        824   LOOPP:   LD      HL,FRAME
852F  ED 4B 04 B0     825            LD      BC,(NBYTE)      ; ENSURE FULL FRAME IS IN DATA BUFFER
8533  A7              826            AND     A               ; CLEAR CARRY
8534  ED 42           827            SBC     HL,BC
8536  F2 2C 85        828            JP      P,LOOPP
8539  C3 3F 85        829            JP      PROCESS         ; ALL ABOVE THRESHOLD, NOW PROCESS DATA
853C  C3 A5 82        830   NOGO:    JP      MATCH           ; START SEARCHING FOR A HEADER BIT AGAIN.
                      831   ;
                      832   ;       PROCESS LOADS ASCII NUMERALS FROM 0 - 8 CORRESPONDING TO THE AMPLITUDES
                      833   ;       OF THE CONSECUTIVE BIT LOCATIONS IN THE DATA.
                      834   ;
853F  DD 21 30 B0     835   PROCESS: LD      IX,DATAS        ; POINT IX AT DATA STRING AREA
8543  06 28           836            LD      B,40            ; PROCESS NEXT 40 BITS
8545  C5              837   PROCL:   PUSH    BC
8546  2A 06 B0        838            LD      HL,(EARLY)
8549  ED 5B 08 B0     839            LD      DE,(LATE)       ; GET EARLY + LATE
854D  19              840            ADD     HL,DE           ; SUM IS IN HL
854E  ED 5B 2C B0     841            LD      DE,(LOWL)       ; SUBTRACT LOW LEVEL
8552  A7              842            AND     A
8553  ED 52           843            SBC     HL,DE
8555  F2 5D 85        844            JP      P,SHIFT
8558  06 00           845            LD      B,0             ; IF LEVEL - LOW LEVEL IS NEG, RETURN 0 IN B
855A  C3 81 85        846            JP      BROW
855D  CB 25           847   SHIFT:   SLA     L               ; GET 8 TIMES (SUM - LOW)
855F  CB 14           848            RL      H
8561  CB 25           849            SLA     L
8563  CB 14           850            RL      H
8565  CB 25           851            SLA     L               ; 4X
8567  CB 14           852            RL      H
8569  ED 5B 2C B0     853            LD      DE,(LOWL)       ; NOTE: HL IS NOW > 0. MAX VALUE = $7F80
856D  E5              854            PUSH    HL              ; GET LOW LEVEL INTO DE
856E  2A 2A B0        855            LD      HL,(HIL)        ; SAVE HL TEMPORARILY
8571  A7              856            AND     A               ; GET HIGH LEVEL INTO HL
8572  ED 52           857            SBC     HL,DE           ; HIGH - LOW : THIS IS THE SYNCH PATTERN AMP.
8574  EB              858            EX      DE,HL           ; INTO DE
8575  E1              859            POP     HL              ; RETRIEVE HL
8576  06 00           860            LD      B,0             ; B REG CONTAINS AMPLITUDE REFERENCE
8578  A7              861            AND     A               ; CLEAR CARRY
8579  ED 52           862   SUBL:    SBC     HL,DE           ; SUBTRACT HIGH LEVEL UNTIL A BORROW NEEDED
857B  DA 81 85        863            JP      C,BROW
857E  04              864            INC     B
857F  18 FB           865            JR      SUBL            ; LOOP UNTIL BORROW
8581  3E 00           866   BROW:    LD      A,0             ;
8583  80              867            ADD     A,B             ; A NOW HAS DATA
8584  DD 77 00        868            LD      (IX),A          ; STORE IN DATA STRING
8587  DD 23           869            INC     IX              ; MOVE POINTER TO NEXT LOCATION
8589  06 10           870            LD      B,16            ; MOVE EARLY AND LATE TO NEXT BIT
858B  C5              871   PRL2:    PUSH    BC
858C  CD 2B 83        872            CALL    ADVANC          ; MOVE 16 AHEAD
858F  C1              873            POP     BC
8590  10 F9           874            DJNZ    PRL2
8592  C1              875            POP     BC              ; GET 40 BIT COUNTER
8593  10 B0           876            DJNZ    PROCL
8595  CD 9B 85        877            CALL    STRING          ; SEND THE DATA STRING
                      878   ;        LD      HL,RING         ; POINT DATA POINTERS TO START OF RING.
                      879   ;        LD      (NXTOUT),HL
                      880   ;        LD      (NXTIN),HL      ; THIS PREVENTS CREEPING ERRORS IN NBYTE
```

```
                              881    ;         LD      HL,0
                              882    ;         LD      (NBYTE),HL      ; SET NBYTE TO ZERO
                              883    ; TITLP:  LD      HL,HEADR        ; WAIT FOR DATA TO BE IN START OF BUFFER
                              884    ;         LD      BC,(NBYTE)
                              885    ;         AND     A
                              886    ;         SBC     HL,BC
                              887    ;         JP      P,TITLP
                              888    ;         CALL    SETRG           ; REINITIALIZE EARLY AND LATE REGISTERS
8598  C3 A5 82                889              JP      MATCH           ; GO TO LOOK FOR THE NEXT TRANSMISSION
                              890    ;
                              891    ;
                              892    ;
                              893    ; STRING READS THE DATA AND BUILDS THE OUTPUT STRING
                              894    ;
859B  3E 44                   895    STRING:   LD      A,'D'
859D  CD 66 86                896              CALL    STRA            ; SEND CHAR IN A TO OUTPUT STRING
85A0  3E 2C                   897              LD      A,','
85A2  CD 66 86                898              CALL    STRA
85A5  FD 21 30 B0             899              LD      IY,DATAS        ; POINT AT FIRST SWITCH OF FIRST SWITCH DATA
85A9  CD 35 86                900              CALL    CHNUM           ; GET ENCODED CHANNEL NUMBER INTO B REG
85AC  C5                      901              PUSH    BC              ; SAVE IT TO COMPARE WITH SECOND TRANSMISSION
85AD  3E 30                   902              LD      A,'0'
85AF  80                      903              ADD     A,B             ; CONVERT CH # TO ASCII
85B0  CD 66 86                904              CALL    STRA
85B3  3E 2C                   905              LD      A,','
85B5  CD 66 86                906              CALL    STRA
85B8  2A 2A B0                907              LD      HL,(HIL)        ; SEND ABSOLUTE SIGNAL STRENGTH SCALED 0-5
85BB  CB 25                   908              SLA     L
85BD  CB 14                   909              RL      H               ; GET 8 TIMES HIGH LEVEL
85BF  CB 25                   910              SLA     L
85C1  CB 14                   911              RL      H
85C3  CB 25                   912              SLA     L
85C5  CB 14                   913              RL      H
85C7  11 F0 0F                914              LD      DE,0FF0H        ; SCALE TO MAX OF $FF PER BIT
85CA  06 00                   915              LD      B,0
85CC  A7                      916              AND     A               ; CLEAR CARRY
85CD  ED 52                   917    SUBL2:    SBC     HL,DE           ; DIVIDE 8X HI LEVEL BY MAX LEVEL
85CF  DA D5 85                918              JP      C,BROW2
85D2  04                      919              INC     B               ; B CONTAINS RESULT OF DIVIDE
85D3  18 F8                   920              JR      SUBL2
85D5  3E 30                   921    BROW2:    LD      A,'0'
85D7  80                      922              ADD     A,B             ; CONVERT TO ASCII
85D8  CD 66 86                923              CALL    STRA
85DB  3E 2C                   924              LD      A,','
85DD  CD 66 86                925              CALL    STRA
85E0  FD 21 38 B0             926              LD      IY,DATAS+8      ; LOOK AT SECOND SWITCH TRANSMISSION
85E4  CD 35 86                927              CALL    CHNUM
85E7  78                      928              LD      A,B             ; GET BINARY CH # INTO ACCUM
85E8  C1                      929              POP     BC              ; GET PREVIOUS VALUE INTO B
85E9  90                      930              SUB     B               ; COMPARE THEM
85EA  CA FA 85                931              JP      Z,GD            ; EQUAL?
85ED  3E 42                   932              LD      A,'B'           ; IF NOT, SEND "B"
85EF  CD 66 86                933              CALL    STRA
85F2  3E 2C                   934              LD      A,','
85F4  CD 66 86                935              CALL    STRA
85F7  C3 04 86                936              JP      GOON
85FA  3E 47                   937    GD:       LD      A,'G'
85FC  CD 66 86                938              CALL    STRA
85FF  3E 2C                   939              LD      A,','
8601  CD 66 86                940              CALL    STRA
8604  FD 21 40 B0             941    GOON:     LD      IY,DATAS+16     ; LOOK AT FIRST SENSOR POSITION
8608  06 17                   942              LD      B,23            ; SEND THE 24 SENSOR VALUES
860A  FD 7E 00                943    GOLP:     LD      A,(IY)          ; GET VALUE INTO ACC
860D  FE 0A                   944              CP      10              ; IS VALUE >= 10?
860F  FA 14 86                945              JP      M,BELL
8612  3E 09                   946              LD      A,9             ; IF SO, SEND A 9.
8614  C6 30                   947    BELL:     ADD     A,'0'           ; MAKE ASCII
8616  CD 66 86                948              CALL    STRA
8619  3E 2C                   949              LD      A,','
861B  CD 66 86                950              CALL    STRA
861E  FD 23                   951              INC     IY              ; POINT AT NEXT SENSOR
8620  10 E8                   952              DJNZ    GOLP            ; SEND FIRST 23 SENSORS
8622  FD 7E 00                953              LD      A,(IY)          ; SEND LAST SENSOR
8625  C6 30                   954              ADD     A,'0'
8627  CD 66 86                955              CALL    STRA
862A  3E 0D                   956              LD      A,13            ; SEND A CR
862C  CD 66 86                957              CALL    STRA
862F  3E 0A                   958              LD      A,0AH           ; SEND A LF
8631  CD 66 86                959              CALL    STRA
8634  C9                      960              RET                     ; DATA SENT
                              961    ;
                              962    ; CHNUM READS THE DATA ON THE FOUR BYTES FROM IY ON AND BUILDS THE CHANNEL
                              963    ;   NUMBER IN THE B REGISTER BY DECIDING THAT A SWITCH IS ON IF ITS LEVEL IS
                              964    ;   ABOVE 4, AND IS OFF IF IT IS 4 OR LESS
8635  06 00                   965    CHNUM:    LD      B,0             ; CLEAR B
8637  FD 7E 00                966              LD      A,(IY)          ; GET SWITCH
863A  FE 05                   967              CP      5
863C  FA 41 86                968              JP      M,NXT1
863F  CB C0                   969              SET     0,B
8641  FD 23                   970    NXT1:     INC     IY              ; POINT AT NEXT SWITCH
8643  FD 7E 00                971              LD      A,(IY)          ; GET SWITCH
8646  FE 05                   972              CP      5
8648  FA 4D 86                973              JP      M,NXT2
864B  CB C8                   974              SET     1,B
864D  FD 23                   975    NXT2:     INC     IY
864F  FD 7E 00                976              LD      A,(IY)          ; GET SWITCH
8652  FE 05                   977              CP      5
8654  FA 59 86                978              JP      M,NXT3
8657  CB D0                   979              SET     2,B
8659  FD 23                   980    NXT3:     INC     IY
865B  FD 7E 00                981              LD      A,(IY)          ; GET SWITCH
865E  FE 05                   982              CP      5
8660  FA 65 86                983              JP      M,NXT4
8663  CB D8                   984              SET     3,B
8665  C9                      985    NXT4:     RET
                              986    ;
                              987    ;
                              988    ;
8666  2A A8 B0                989    STRA:     LD      HL,(CHARIN)     ; GET POINTER TO NEXT CHAR LOCATION
8669  77                      990              LD      (HL),A          ; STORE CHARACTER
```

```
866A 23            991              INC    HL
866B 22 AB B0      992              LD     (CHARIN),HL    ; POINT TO NEXT LOCATION
866E 34 AC B0      993              LD     A,(NCHAR)
8671 3C            994              INC    A
8672 32 AC B0      995              LD     (NCHAR),A       ; INCREMENT NCHAR COUNTER
8675 C9            996              RET
                   997       ;
                   998       ;
                   999       ; A/D CONVERTER TEST PROGRAM... THIS IS FROM PG 4-2 IN THE SYSTEM MANUAL
                  1000       ;
020F              1001  CO     EQU    020FH
025A              1002  CRLF   EQU    025AH
0237              1003  INTST  EQU    0237H
0310              1004  NEWLIN EQU    0310H
019E              1005  PHEX   EQU    019EH
03B9              1006  XPSP   EQU    03B9H
                  1007       ;
8700              1008              ORG    08700H
8700 0E 7E        1009  ANALOG: LD    C,07EH                ; CLEAR SCREEN
8702 CD 0F 02     1010              CALL   CO
8705 0E 1C        1011              LD     C,1CH
8707 CD 0F 02     1012              CALL   CO
870A 0E 80        1013  S0:         LD     C,80H
870C 1F 04        1014              LD     E,04H
870E 16 08        1015  S1:         LD     D,8H
8710 79           1016  S2:         LD     A,C
8711 D3 03        1017              OUT    (03H),A
8713 DB 01        1018              IN     A,(01H)
8715 CD 9E 01     1019              CALL   PHEX
8718 DB 02        1020              IN     A,(02H)
871A CD 9E 01     1021              CALL   PHEX
871D CD B9 03     1022              CALL   XPSP
8720 79           1023              LD     A,C
8721 3C           1024              INC    A
8722 E6 9F        1025              AND    09FH
8724 4F           1026              LD     C,A
8725 15           1027              DEC    D
8726 C2 10 87     1028              JP     NZ,S2
8729 CD 5A 02     1029              CALL   CRLF
872C CD 5A 02     1030              CALL   CRLF
872F 1D           1031              DEC    E
8730 C2 0E 87     1032              JP     NZ,S1
8733 CD 37 02     1033              CALL   INTST
8736 DA 10 03     1034              JP     C,NEWLIN
8739 0E 7E        1035              LD     C,7EH
873B CD 0F 02     1036              CALL   CO
873E 0E 12        1037              LD     C,12H
8740 CD 0F 02     1038              CALL   CO
8743 C3 0A 87     1039              JP     S0
8746             1040        END
```

SYMBOL TABLE LIST

| SYMBOL | VALUE | TYPE | SEGMENT | SYMBOL | VALUE | TYPE | SEGMENT | SYMBOL | VALUE | TYPE | SEGMENT | SYMBOL | VALUE | TYPE | SEGMENT |
|---|---|---|---|---|---|---|---|---|---|---|---|---|---|---|---|
| $ | 0000 | ADDR | MAIN | EARL | 8298 | ADDR | MAIN | MAXV | 800E | ADDR | MAIN | REENT | 8127 | ADDR | MAIN |
| A | 0007 | REG | MAIN | EARLY | 8006 | ADDR | MAIN | NBYTE | B004 | ADDR | MAIN | RING | A000 | CNST | MAIN |
| AD | 0000 | CNST | MAIN | ENDAD | 835F | ADDR | MAIN | NC | 0013 | REG | MAIN | RSTBV | F7EB | CNST | MAIN |
| ADD5 | 8445 | ADDR | MAIN | ENDBA | 84C0 | ADDR | MAIN | NCHAR | B0AC | ADDR | MAIN | RTI | 80FE | ADDR | MAIN |
| ADDL | 8447 | ADDR | MAIN | ENDCOD | 8700 | CNST | MAIN | NCRY | B29E | ADDR | MAIN | S0 | 870A | ADDR | MAIN |
| ADERR | 812F | ADDR | MAIN | ENDIN2 | 8271 | ADDR | MAIN | NEWLIN | 0310 | CNST | MAIN | S1 | 870E | ADDR | MAIN |
| ADVANC | 832B | ADDR | MAIN | ERROR | 80B0 | ADDR | MAIN | NEXT1 | 843F | ADDR | MAIN | S2 | 8710 | ADDR | MAIN |
| AF | 000B | REG | MAIN | FOURSA | 8020 | ADDR | MAIN | NIB | 8140 | ADDR | MAIN | SEARCH | B2FC | ADDR | MAIN |
| AF' | 0019 | REG | MAIN | FOURSM | 8016 | ADDR | MAIN | NOCHK | 806F | ADDR | MAIN | SER | 00C0 | CNST | MAIN |
| ANALOG | 8700 | ADDR | MAIN | FRAME | 0300 | CNST | MAIN | NOGO | 853C | ADDR | MAIN | SETRG | 8274 | ADDR | MAIN |
| ATODE | 8136 | ADDR | MAIN | GD | 85FA | ADDR | MAIN | NOISE | 800C | ADDR | MAIN | SHIFT | 855D | ADDR | MAIN |
| AVERG | 800A | ADDR | MAIN | GOLP | 860A | ADDR | MAIN | NOSEND | 808F | ADDR | MAIN | SKIP | 8369 | ADDR | MAIN |
| B | 0000 | REG | MAIN | GOON | 8604 | ADDR | MAIN | NSEND2 | 8098 | ADDR | MAIN | SKIP2 | 8498 | ADDR | MAIN |
| BACKUP | 8489 | ADDR | MAIN | GOPNT | 8360 | ADDR | MAIN | NXT1 | 8641 | ADDR | MAIN | SKIP3 | 84D5 | ADDR | MAIN |
| BC | 0008 | REG | MAIN | H | 0004 | REG | MAIN | NXT2 | 864D | ADDR | MAIN | SLOOP | 846A | ADDR | MAIN |
| BELL | 8614 | ADDR | MAIN | HEADR | 0064 | CNST | MAIN | NXT3 | 8659 | ADDR | MAIN | SP | 000E | REG | MAIN |
| BGO | 84BB | ADDR | MAIN | HIL | B02A | ADDR | MAIN | NXT4 | 8665 | ADDR | MAIN | SPERR | 81D6 | ADDR | MAIN |
| BPOINT | 84C1 | ADDR | MAIN | HL | 000A | REG | MAIN | NXTIN | B000 | ADDR | MAIN | SPSAV | B0AD | ADDR | MAIN |
| BROW | 85B1 | ADDR | MAIN | I | 000F | REG | MAIN | NXTOUT | B002 | ADDR | MAIN | SPSV2 | B0B4 | ADDR | MAIN |
| BROW2 | 85D5 | ADDR | MAIN | INIT | 81DC | ADDR | MAIN | NZ | 0011 | REG | MAIN | STCHAR | B058 | ADDR | MAIN |
| C | 0001 | REG | MAIN | INIT2 | 824F | ADDR | MAIN | OK | B0D2 | ADDR | MAIN | STRA | 8666 | ADDR | MAIN |
| CALCK | 806C | ADDR | MAIN | INITNU | 03E8 | CNST | MAIN | ORGCOD | 81B0 | CNST | MAIN | STRING | 859B | ADDR | MAIN |
| CHAR | B0AA | ADDR | MAIN | INL | 8263 | ADDR | MAIN | OUT | 8487 | ADDR | MAIN | SUBL | 8579 | ADDR | MAIN |
| CHARIN | B0AB | ADDR | MAIN | INT | B000 | ADDR | MAIN | OUTL | 8261 | ADDR | MAIN | SUBL2 | 85CD | ADDR | MAIN |
| CHECK2 | 84DA | ADDR | MAIN | INTFL | B0B1 | ADDR | MAIN | P | 0017 | REG | MAIN | SYNCH | 83C6 | ADDR | MAIN |
| CHK | 850B | ADDR | MAIN | INTL | 8039 | ADDR | MAIN | PADAT | FBE0 | CNST | MAIN | SYNCHA | B014 | ADDR | MAIN |
| CHL1 | 83F7 | ADDR | MAIN | INTST | 0237 | CNST | MAIN | PADDR | FBE4 | CNST | MAIN | SYNCHV | B012 | ADDR | MAIN |
| CHL2 | 8401 | ADDR | MAIN | IX | 000C | REG | MAIN | PASAV | B0AF | ADDR | MAIN | TEST | 8119 | ADDR | MAIN |
| CHL3 | 841D | ADDR | MAIN | IY | 000D | REG | MAIN | PBBC | FBE9 | CNST | MAIN | THRESH | 8395 | ADDR | MAIN |
| CHL4 | 84F0 | ADDR | MAIN | JINIT | 8114 | ADDR | MAIN | PBBS | FBED | CNST | MAIN | THRSK | 83A7 | ADDR | MAIN |
| CHL5 | 8522 | ADDR | MAIN | L | 0005 | REG | MAIN | PBDAT | FBB1 | CNST | MAIN | TOGGLE | 80D9 | ADDR | MAIN |
| CHNUM | 8635 | ADDR | MAIN | LATE | 8008 | ADDR | MAIN | PBDDR | FBB5 | CNST | MAIN | TOPRAM | BDFF | CNST | MAIN |
| CHSTK | 81BD | ADDR | MAIN | LESS | 8326 | ADDR | MAIN | PE | 0016 | REG | MAIN | TRBL | 818B | ADDR | MAIN |
| CKER | 8160 | ADDR | MAIN | LNIB | 815B | ADDR | MAIN | PHEX | 019E | CNST | MAIN | TRIG | B02E | ADDR | MAIN |
| CLEAR | 83D6 | ADDR | MAIN | LOOPP | 852C | ADDR | MAIN | PIA | FBB0 | CNST | MAIN | UPDATE | 836F | ADDR | MAIN |
| CO | 020F | CNST | MAIN | LOWL | B02C | ADDR | MAIN | PO | 0015 | REG | MAIN | URST | F7F5 | CNST | MAIN |
| COUNT | B0B2 | ADDR | MAIN | LT | 8171 | ADDR | MAIN | POZ | 8388 | ADDR | MAIN | VALIDA | 8190 | ADDR | MAIN |
| CRLF | 025A | CNST | MAIN | M | 0018 | REG | MAIN | PRL2 | 858B | ADDR | MAIN | VALSP | 81DB | ADDR | MAIN |
| D | 0002 | REG | MAIN | MATCH | 82A5 | ADDR | MAIN | PROCES | 853F | ADDR | MAIN | XPSP | 03B9 | CNST | MAIN |
| DATAS | B030 | ADDR | MAIN | MATCH2 | 82D9 | ADDR | MAIN | PROCL | 8545 | ADDR | MAIN | Z | 0012 | REG | MAIN |
| DE | 0009 | REG | MAIN | MAXA | B010 | ADDR | MAIN | PROMPT | 0313 | CNST | MAIN | | | | |
| E | 0003 | REG | MAIN | MAXBYT | 0708 | CNST | MAIN | R | 0010 | REG | MAIN | | | | |

Z80 Cross Assembler V4.0 -- Cross Reference                    Program : FINAL

| SYMBOL | #REFS | Defn | Lines of reference | | | | | | | | | | |
|---|---|---|---|---|---|---|---|---|---|---|---|---|---|
| AD | 7 | 19 | 94 | 98 | 108 | 110 | 335 | 337 | | | | | |
| ADD5 | 2 | 692 | 654 | | | | | | | | | | |
| ADDL | 2 | 693 | 707 | | | | | | | | | | |
| ADERR | 2 | 221 | 96 | | | | | | | | | | |
| ADVANC | 7 | 528 | 380 | 503 | 658 | 703 | 819 | 872 | | | | | |
| ANALOG | 1 | 1009 | | | | | | | | | | | |
| ATODE | 3 | 229 | 162 | 475 | | | | | | | | | |
| AVERG | 4 | 33 | 331 | 574 | 583 | | | | | | | | |
| BACKUP | 4 | 736 | 633 | 634 | 723 | | | | | | | | |
| BELL | 2 | 947 | 945 | | | | | | | | | | |
| BGO | 2 | 730 | 728 | | | | | | | | | | |
| BPOINT | 3 | 769 | 749 | 755 | | | | | | | | | |
| BROW | 3 | 866 | 846 | 863 | | | | | | | | | |
| BROW2 | 2 | 921 | 918 | | | | | | | | | | |
| CALCK | 2 | 126 | 117 | | | | | | | | | | |
| CHAR | 5 | 47 | 136 | 140 | 143 | 325 | | | | | | | |
| CHARIN | 7 | 46 | 144 | 151 | 167 | 326 | 989 | 992 | | | | | |
| CHECK2 | 2 | 790 | 685 | | | | | | | | | | |
| CHK | 2 | 808 | 799 | | | | | | | | | | |
| CHL1 | 2 | 653 | 662 | | | | | | | | | | |
| CHL2 | 2 | 657 | 660 | | | | | | | | | | |
| CHL3 | 2 | 670 | 684 | | | | | | | | | | |
| CHL4 | 2 | 798 | 823 | | | | | | | | | | |
| CHL5 | 2 | 818 | 821 | | | | | | | | | | |
| CHNUM | 3 | 965 | 900 | 927 | | | | | | | | | |
| CHSTR | 4 | 300 | 285 | 289 | 297 | | | | | | | | |
| CKER | 2 | 257 | 122 | | | | | | | | | | |
| CLEAR | 2 | 637 | 639 | | | | | | | | | | |
| CO | 5 | 1001 | 1010 | 1012 | 1036 | 1038 | | | | | | | |
| CCUNT | 4 | 53 | 181 | 183 | 334 | | | | | | | | |
| CRLF | 3 | 1002 | 1029 | 1030 | | | | | | | | | |
| DATAS | 5 | 44 | 835 | 899 | 926 | 941 | | | | | | | |
| EARL | 5 | 403 | 293 | 394 | 398 | 410 | | | | | | | |
| EARLY | 13 | 31 | 294 | 390 | 395 | 505 | 532 | 537 | 695 | 752 | 757 | 804 | 809 | 838 |
| ENDAD | 1 | 551 | | | | | | | | | | | |
| ENDBA | 1 | 762 | | | | | | | | | | | |
| ENDCOD | 2 | 9 | 276 | | | | | | | | | | |
| ENDIN2 | 1 | 385 | | | | | | | | | | | |
| ERROR | 12 | 51 | 145 | 161 | 171 | 221 | 262 | 280 | 298 | 310 | 333 | 480 | 726 |
| FOURSA | 1 | 40 | | | | | | | | | | | |
| FOURSM | 12 | 39 | 635 | 641 | 643 | 645 | 647 | 649 | 650 | 655 | 664 | 665 | 667 |
| FRAME | 2 | 12 | 824 | | | | | | | | | | |
| GD | 2 | 937 | 931 | | | | | | | | | | |
| GOLP | 2 | 943 | 952 | | | | | | | | | | |
| GOON | 2 | 941 | 936 | | | | | | | | | | |
| GOPN1 | 3 | 559 | 535 | 541 | | | | | | | | | |
| HEADR | 2 | 11 | 451 | | | | | | | | | | |
| HIL | 6 | 41 | 756 | 805 | 807 | 855 | 907 | | | | | | |
| INIT | 2 | 318 | 206 | | | | | | | | | | |
| INIT2 | 2 | 370 | 374 | | | | | | | | | | |
| INITNU | 2 | 10 | 370 | | | | | | | | | | |
| INL | 2 | 378 | 382 | | | | | | | | | | |
| INT | 2 | 73 | 354 | | | | | | | | | | |
| INTFL | 5 | 52 | 81 | 85 | 198 | 359 | | | | | | | |
| INTL | 2 | 102 | 104 | | | | | | | | | | |
| INTS1 | 2 | 1003 | 1033 | | | | | | | | | | |
| JINIT | 8 | 204 | 79 | 148 | 173 | 191 | 196 | 219 | 223 | | | | |
| LATE | 12 | 32 | 391 | 399 | 504 | 538 | 543 | 694 | 746 | 751 | 800 | 808 | 839 |
| LESS | 2 | 520 | 512 | | | | | | | | | | |
| LNIB | 2 | 248 | 246 | | | | | | | | | | |
| LOOPP | 2 | 824 | 828 | | | | | | | | | | |
| LOWL | 6 | 42 | 795 | 801 | 803 | 841 | 853 | | | | | | |
| LT | 2 | 264 | 261 | | | | | | | | | | |
| MATCH | 7 | 461 | 282 | 385 | 473 | 493 | 830 | 889 | | | | | |
| MATCH2 | 3 | 484 | 286 | 467 | | | | | | | | | | |
| MAXA | 4 | 36 | 516 | 717 | 791 | | | | | | | | |
| MAXBYT | 2 | 7 | 258 | | | | | | | | | | |
| MAXV | 5 | 35 | 485 | 489 | 509 | 514 | | | | | | | |
| NBYTE | 12 | 30 | 119 | 121 | 257 | 329 | 371 | 462 | 548 | 550 | 759 | 761 | 825 |
| NCHAR | 9 | 48 | 127 | 135 | 168 | 170 | 188 | 332 | 993 | 995 | | | |
| NCRY | 2 | 407 | 405 | | | | | | | | | | |
| NEWLIN | 2 | 1004 | 1034 | | | | | | | | | | |
| NEXT1 | 2 | 683 | 676 | | | | | | | | | | |
| NIB | 3 | 234 | 230 | 232 | | | | | | | | | |
| NOCHK | 2 | 127 | 125 | | | | | | | | | | |
| NOGO | 2 | 830 | 815 | | | | | | | | | | |
| NOISE | 5 | 34 | 330 | 588 | 595 | 601 | | | | | | | |
| NOSEND | 2 | 142 | 129 | | | | | | | | | | |
| NSEND2 | 3 | 145 | 133 | 141 | | | | | | | | | |
| NXT1 | 2 | 970 | 968 | | | | | | | | | | |
| NXT2 | 2 | 975 | 973 | | | | | | | | | | |
| NXT3 | 2 | 980 | 978 | | | | | | | | | | |
| NXT4 | 2 | 985 | 983 | | | | | | | | | | |
| NXTIN | 6 | 28 | 106 | 111 | 118 | 174 | 323 | | | | | | |
| NXTOUT | 14 | 29 | 114 | 290 | 322 | 393 | 515 | 528 | 544 | 547 | 573 | 640 | 716 | 737 |
| | | 758 | | | | | | | | | | | |
| OK | 2 | 174 | 147 | | | | | | | | | | |
| ORGCOD | 2 | 8 | 268 | | | | | | | | | | |
| OUT | 2 | 729 | 722 | | | | | | | | | | |
| OUTL | 2 | 377 | 384 | | | | | | | | | | |
| PADA1 | 6 | 22 | 89 | 90 | 180 | 340 | 604 | | | | | | |
| PADDR | 2 | 23 | 339 | | | | | | | | | | |
| PASAV | 6 | 50 | 86 | 88 | 177 | 179 | 341 | | | | | | |
| PBGC | 3 | 26 | 193 | 361 | | | | | | | | | |
| PBBS | 3 | 27 | 194 | 362 | | | | | | | | | |
| PEDA1 | 1 | 25 | | | | | | | | | | | |
| PDDR | 2 | 24 | 345 | | | | | | | | | | |
| PHEX | 3 | 1005 | 1019 | 1021 | | | | | | | | | |
| PIA | 1 | 21 | | | | | | | | | | | |
| POZ | 2 | 588 | 586 | | | | | | | | | | |
| PRL2 | 2 | 871 | 874 | | | | | | | | | | |
| PROCES | 2 | 835 | 829 | | | | | | | | | | |
| PROCL | 2 | 837 | 876 | | | | | | | | | | |
| PROMPT | 3 | 18 | 211 | 483 | | | | | | | | | |
| REENT | 2 | 216 | 83 | | | | | | | | | | |
| RING | 2 | 17 | 321 | | | | | | | | | | |

```
RSTBV      4    15    210   356  357
RTI        5   192    176   187  190   214
S0         2  1013   1039
S1         2  1015   1032
S2         2  1016   1028
SEARCH     5   501    487   495  518   522
SER        7    20    130   138  347   349   351   353
SETRG      2   389    375
SHIF1      2   847    844
SKIP       2   564    561
SKIP2      2   743    740
SKIP3      3   781    772   777
SLOOP      4   715    632   725  793
SPERR      2   310    304
SPSAV      6    49     76    77  300   306   320
SPSV2      4    54    468   469  474
S1CHAR     3    45    142   324
STHA      19   989    217   477  479   896   898   904   906   923   925   933   935   938
               940    948   950  955   957   959
STRING     2   895    877
SUBL       2   862    865
SUBL2      2   917    920
SYNCH      2   631    496
SYNCHA     4    38    666   682  790
SYNCHV     4    37    668   675  679
TEST       3   209     92   150
THRESH     3   601    400   488
THRSK      2   609    606
TOGGLE     1   177
TOPRAM     5    14    301   305  319   470
TRBL       2   250    271
TRIG       4    43    490   623  812
UPDATE     3   573    379   502
URST       1    16
VALIDA     2   282    279
VALSP      2   312    309
XPSP       2  1006   1022

0 Error(s) in Program
   166 symbols in program
0 00:02:09.71 to assemble       1040 lines.
```

We claim:

1. A detector system for sensing the progress of an ISV process along an expected path through a body of vitrifiable soil, the detector system comprising:
   a plurality of sensors each having an input port, the input ports being distributed along the expected path of the ISV process between a starting location and an expected ending location, each sensor being operative to generate an output signal representative of the temperature in the vicinity of its input port,
   signal processor and transmitter means coupled to the sensors for receiving an output signal generated by a sensor, generating a signal which is encoded with information which identifies the sensor and information which is representative of the temperature in the vicinity of the input port of the sensor, and propagating the encoded signal, the signal processor and transmitter means being below ground at a location beyond the expected ending location of the ISV process in the direction from the starting location to the expected ending location, and
   signal receiver and decoder means located outside the body of soil for receiving the encoded signal propagated by the signal processor and transmitter means and decoding the encoded signal.

2. A detector system according to claim 1, wherein each sensor comprises:
   an optical fiber having first and second opposite ends, the first end of the optical fiber constituting the input port of the sensor and the second end of the fiber being below ground at a location beyond the expected ending location of the ISV process in the direction from the starting location to the expected ending location, and
   a photodetector positioned to receive light emitted by the optical fiber by way of its second end.

3. A detector system according to claim 2, further comprising a housing in which the photodetectors and the signal processor and transmitter means are mounted.

4. A detector system according to claim 2, wherein each optical fiber comprises a core of vitreous material and a cladding of vitreous material.

5. A detector system according to claim 4, wherein each optical fiber comprises a core of silica and a cladding of silica-based material.

6. A detector system according to claim 5, wherein the cladding is made of silica plus flourine.

7. A detector system according to claim 1, wherein the signal processor and transmitter means comprise a signal processor which generates a signal which is encoded with information which identifies each sensor and information which is representative of the temperature in the vicinity of the input port of that sensor, a transmitter for receiving the encoded signal generated by the signal processor and using the encoded signal to modulate a carrier, and an antenna connected to the transmitter for receiving the modulated carrier.

8. A detector system according to claim 7, wherein the encoded signal generated by the signal processor is composed of multiple time slots associated with the sensors respectively.

9. A detector system according to claim 7, further comprising a battery and a switch which connects the battery to the signal processor and transmitter means, the switch being open when the signal processor and transmitter means are in a storage orientation and being closed when the signal processor and transmitter means are in a use orientation.

10. A detector system according to claim 1, wherein the signal receiver and decoder means are located above ground and comprise means for providing a human-perceptible indication of the progress of the ISV process.

11. Apparatus for carrying out an ISV process on a body of vitrifiable soil, said apparatus comprising:
   at least two electrodes extending within the body of soil, and
   at least one a detector system for sensing the progress of the ISV process along an expected path, the detector system comprising:

a plurality of sensors each having an input port, the input ports being distributed along the expected path of the ISV process between a starting location and an expected ending location and each sensor being operative to generate an output signal representative of the temperature in the vicinity of its input port, signal processor and transmitter means coupled to the sensors for receiving an output signal generated by a sensor, generating a signal which is encoded with information which identifies the sensor and information which is representative of the temperature in the vicinity of the input port of the sensor, and propagating the encoded signal, the signal processor and transmitter means being below ground at a location beyond the expected ending location of the ISV process in the direction from the starting location to the expected ending location, and signal receiver and decoder means located outside the body of soil for receiving the encoded signal propagated by the signal processor and transmitter means and decoding the encoded signal.

12. Apparatus according to claim 11, wherein each sensor comprises:

an optical fiber having first and second opposite ends, the first end of the optical fiber constituting the input port of the sensor and the second end of the fiber being below ground at a location beyond the expected ending location of the ISV process in the direction from the starting location to the expected ending location, and a photodetector positioned to receive light emitted by the optical fiber by way of its second end.

13. Apparatus according to claim 12, further comprising a housing in which the photodetectors and the signal processor and transmitter means are mounted.

14. Apparatus according to claim 11, wherein each optical fiber comprises a core of silica and a cladding of silica plus flourine.

15. Apparatus according to claim 11, wherein the signal processor and transmitter means comprise a signal processor which generates a signal which is encoded with information which identifies each sensor and information which is representative of the temperature in the vicinity of the input port of that sensor, a transmitter for receiving the encoded signal generated by the signal processor and using the encoded signal to modulate a carrier, and an antenna connected to the transmitter for receiving the modulated carrier.

16. Apparatus according to claim 15, further comprising a battery and a switch which connects the battery to the signal processor and transmitter means, the switch being open when the signal processor and transmitter means are in a storage orientation and being closed when the signal processor and transmitter means are in a use orientation.

17. Apparatus according to claim 11, wherein the signal receiver and decoder means are located above ground and comprise means for providing a human-perceptible indication of the progress of the ISV process.

18. Apparatus according to claim 11, wherein the signal processor and transmitter means are located in axial alignment with one of the electrodes.

19. A method of carrying out an ISV process using at least two electrodes extending within a body of vitrifiable soil, the method comprising:

positioning a plurality of sensors, each having an input port, in the body of soil so that the input ports are distributed along an expected path of the ISV process between a starting location and an expected ending location, each sensor being operative to generate an output signal representative of the temperature in the vicinity of its input port, and locating signal processor and transmitter means below ground at a location beyond the expected ending location of the ISV process in the direction from the starting location to the expected ending location, the signal processor and transmitter means being coupled to receive the output signals generated by the sensors and responding to an output signal generated by one of the sensors by generating a signal which is encoded with information which identifies the sensor and information which is representative of the temperature in the vicinity of the input port of the sensor and propagating the encoded signal.

20. A method according to claim 19, further comprising receiving the propagated signal at a location outside the body of soil, and decoding the received signal.

21. A method according to claim 20, wherein the propagated signal is received at a location above ground and the method further comprises providing a human-perceptible indication of the progress of the ISV process.

22. A detection system for sensing the progress of an ISV process along an expected path through a body of vitrifiable soil, the detector system comprising:

an optical fiber having first and second opposite ends and comprising a core of vitreous material and a cladding of vitreous material, the first end of the optical fiber being at a position on the expected path of the ISV process and the second end of the optical fiber being outside the body of soil, and a photodetector in optically-coupled relationship with the second end of the optical fiber for generating an electrical signal that is representative of the power with which electromagnetic energy is received at the first end of the optical fiber.

23. A detection system according to claim 22, wherein the optical fiber comprises a core of silica and a cladding of silica-based material.

24. A detection system according to claim 23, wherein the cladding is made of silica plus fluorine.

25. A detector system for sensing the progress of an ISV process along an expected path through a body of vitrifiable soil, the detector system comprising:

at least one sensor having an input port at a position on the expected path of the ISV process between a starting location and an expected ending location, the sensor being operative to generate an output signal representative of the temperature in the vicinity of its input port, and a transmitter assembly which, in use, is below ground at a location beyond the expected ending location of the ISV process in the direction from the starting location to the expected ending location, said transmitter assembly comprising:

transmitter means coupled to the sensor for receiving an output signal generated by the sensor, generating a signal which is encoded with information which is representative of the temperature in the vicinity of the input port of the sensor, and propagating the encoded signal,
a self-contained power supply, and
a switch which is connected between the power supply and the transmitter means, the switch being non-conductive when the transmitter assembly is in a storage orientation and being conductive when the transmitter assembly is in a use orientation.

* * * * *